United States Patent
Dunfield et al.

[11] Patent Number: 6,080,352
[45] Date of Patent: Jun. 27, 2000

[54] METHOD OF MAGNETIZING A RING-SHAPED MAGNET

[75] Inventors: John C. Dunfield, Chatsworth; Gunter K. Heine, Aptos, both of Calif.; Marcel Jufer, Morges, Switzerland; Kamran Oveyssi, Aptos, Calif.

[73] Assignee: Seagate Technologies, Inc., Scotts Valley, Calif.

[21] Appl. No.: 08/828,487

[22] Filed: Mar. 31, 1997

Related U.S. Application Data

[60] Continuation-in-part of application No. 08/479,619, Jun. 7, 1995, abandoned, which is a division of application No. 08/273,535, Jul. 11, 1994, abandoned.

[51] Int. Cl.$^7$ ............................. B29C 71/04; H01F 13/00
[52] U.S. Cl. ........................ 264/427; 29/607; 148/103; 148/108; 264/DIG. 58; 425/3
[58] Field of Search ........................ 264/427, DIG. 58; 29/607; 148/103, 108; 425/3

[56] References Cited

U.S. PATENT DOCUMENTS

| | | | |
|---|---|---|---|
| 3,102,964 | 9/1963 | Bennett et al. | 310/154 |
| 3,662,359 | 5/1972 | Genovese | 340/174 TF |
| 3,694,115 | 9/1972 | Steingroever | 425/3 |
| 3,802,935 | 4/1974 | Martin et al. | 148/103 |
| 4,216,512 | 8/1980 | Vidwans | 360/133 |
| 4,228,387 | 10/1980 | Brown | 318/696 |
| 4,306,259 | 12/1981 | Saito et al. | 360/99 |
| 4,337,491 | 6/1982 | Hasler et al. | 360/97 |
| 4,438,362 | 3/1984 | Brown | 310/152 |
| 4,445,078 | 4/1984 | Lange | 318/729 |
| 4,484,114 | 11/1984 | Ebbs | 318/138 |
| 4,491,751 | 1/1985 | Kuznetsova et al. | 310/49 R |
| 4,546,293 | 10/1985 | Peterson et al. | 318/254 |
| 4,571,516 | 2/1986 | Schneiter | 310/49 R |
| 4,575,652 | 3/1986 | Gogue | 310/49 R |
| 4,584,506 | 4/1986 | Kaszmann | 318/254 |
| 4,599,664 | 7/1986 | Schuh | 360/97 |
| 4,644,233 | 2/1987 | Suzuki | 318/254 |
| 4,658,311 | 4/1987 | Sakaguchi | 360/97 |
| 4,673,849 | 6/1987 | Sears et al. | 318/272 |
| 4,701,653 | 10/1987 | Merkle et al. | 310/152 |
| 4,701,683 | 10/1987 | Kikkawa | 318/254 |
| 4,737,674 | 4/1988 | Miyao | 310/268 |
| 4,757,241 | 7/1988 | Young | 318/254 |
| 4,905,110 | 2/1990 | Krum et al. | 360/99.08 |
| 4,908,808 | 3/1990 | Knapen et al. | 368/157 |
| 4,935,655 | 6/1990 | Ebner | 310/154 |
| 4,948,999 | 8/1990 | Bertram et al. | 310/162 |
| 4,968,913 | 11/1990 | Sakamoto | 310/156 |
| 4,992,710 | 2/1991 | Cassat | 3318/254 |
| 5,028,852 | 7/1991 | Dunfield | 318/254 |
| 5,093,599 | 3/1992 | Horng | 310/254 |
| 5,117,155 | 5/1992 | Buhler | 315/8 |
| 5,146,144 | 9/1992 | Lee | 318/138 |
| 5,191,269 | 3/1993 | Carbolante | 318/254 |
| 5,191,270 | 3/1993 | McCormack | 318/254 |
| 5,204,569 | 4/1993 | Hino et al. | 310/154 |
| 5,221,881 | 6/1993 | Cameron | 318/254 |
| 5,233,275 | 8/1993 | Danino | 318/254 |
| 5,234,192 | 8/1993 | Kalippke et al. | 251/129 |
| 5,254,914 | 10/1993 | Dunfield et al. | 318/254 |
| 5,294,856 | 3/1994 | Horst | 310/181 |
| 5,343,127 | 8/1994 | Maiocchi | 318/254 |
| 5,392,176 | 2/1995 | Anderson | 360/97.01 |
| 5,783,890 | 7/1998 | Mulgrave | 310/156 |

FOREIGN PATENT DOCUMENTS

| | | |
|---|---|---|
| 772324 | 10/1934 | France . |
| 1033643 | 7/1953 | France . |
| 1 518 886 | 7/1978 | United Kingdom . |

*Primary Examiner*—Jan H. Silbauch
*Assistant Examiner*—Michael Poe
*Attorney, Agent, or Firm*—LaRiviere, Grubman & Payne, LLP

[57] ABSTRACT

A brushless permanent-magnet direct current motor has a permanent magnet which is magnetized to create an offset angle between detent and mutual torques for providing sufficient starting torque for all relative orientations between the stator and the rotor of the motor. This is accomplished by providing a permanent magnet in which the global magnetization of the magnet has been disrupted by the application of a local magnetic field to a portion of the magnet, thereby to provide a magnetic anomaly in the global magnetization. Also, a method of magnetization of the magnet is described.

10 Claims, 15 Drawing Sheets

METHOD OF MAGNETIZING A RING-SHAPED MAGNET

RELATED APPLICATION DATA

This application is a continuation-in-part of Ser. No. 08/479,619 filed Jun. 7, 1995, now abandoned, which is a divisional of Ser. No. 08/273,535 filed Jul. 11, 1994, now abandoned.

TECHNICAL FIELD

The present invention generally relates to permanent-magnet direct current (PMDC) electric motors, and more specifically relates to internal stator, brushless PMDC single-phase spindle motors for use in hard disc drives.

BACKGROUND ART

PMDC motors employ magnetized materials to supply pole flux. Some materials employed for use in PMDC motors may be found among several classes of permanent-magnet materials, including alnicos, neodymium-iron-borons, ceramics (ferrites), and rare-earth materials. Because a permanent-magnet (PM) is used, the flux per pole, $\Phi$, is not adjustable in PMDC motors. The static torque which can be applied to an unexcited motor without causing continuous rotation is termed the detent torque. The latter torque arises in PM motors owing to the continual presence of a magnetic field even in the absence of applied current (excitation) to the armature winding.

The position at which a PM rotor comes to rest without excitation at no-load is termed the detent position. The detent position is the location where detent torque equals zero.

In PMDC motors, the armature circuit includes, in part, an armature winding about a portion of the stator core. The armature winding is sometimes referred to as a stator coil or stator winding. In brushless PMDC motors, the armature winding receives a current which produces a "revolving" flux in the air gap between the stator and rotor. This revolving flux causes the PM rotor to revolve with respect to the stator for producing torque. The torque produced when the motor is excited is a combination of mutual and detent torques. Mutual torque arises from the forces of attraction and repulsion between the poles of the PM and the opposite electromagnet poles of the excited stator coil.

As is known, motors may be single-phase or polyphase. In single-phase PMDC motors, only one set of armature windings is employed. Thus, one or more "coils" in series may be used for the armature winding, while retaining the single-phase characteristic.

A problem associated with single-phase PM motors is starting. Single-phase PM motors detent at detent torque nulls (locations where no detent torque exists). If these detent torque nulls coincide with mutual torque nulls, then there is no torque for starting the motor when current is applied. In order to start a single-phase PMDC motor, current must be delivered to the motor, and the PM rotor must be at a position where useful torque is delivered to the motor. As applied to spindle ("spinning") motors for hard disc drives, single-phase PMDC motors must be started prior to obtaining constant rotation.

DISCLOSURE OF INVENTION

In accordance with the present invention, a single-phase PMDC motor provides an offset angle between null detent and null mutual torques to provide sufficient starting torque for starting the motor. Because the rotor PM is not located at a torque null at start-up, the present invention ensures that the motor is in a starting position when excited. Hence, the motor may be started by the interaction of flux (e.g., from a PM) and coil excitation. By economically providing an offset angle between mutual and detent torques, the present invention facilitates manufacture of a low cost single-phase motor with performance characteristics sufficient for spindle motor hard disc drive operation.

The present invention thus introduces an offset angle between detent torque and mutual torques to avoid locating the rotor PM at a zero starting torque location. Prior to exciting the motor, the rotor PM is at a detent position. The PM poles of the rotor are thus located at a detent torque null. When the stator coil is excited, the PM poles will tend to align with the electromagnetic poles of the stator, i.e., a mutual torque null location. As the detent and mutual torque null locations are offset from one and other, this translates into physical movement (rotation) of the PM pole for alignment with the electromagnetic poles of the stator. (This of course assumes sufficient current is supplied to the stator coil for overcoming the detent torque.) In other words, owing to introduction of an offset angle, there will be mutual torque at the detent torque null location. Therefore, the motor will be capable of delivering torque to the motor for causing the rotor to rotate when the stator coil is excited.

In accordance with the present invention, an offset angle may be introduced by shifting both the detent and mutual torque. While phase shift of the detent torque may not equal phase shift of the mutual torque, the combined shift of detent and mutual torques provides a net shift, namely, an offset angle. Moreover, in accordance with the present invention, the proportion of phase shift of the mutual torque may be significantly larger than any phase shift of the detent torque.

There are several different mechanisms for introducing the offset angle in an internal stator, PMDC, single-phase motor in accordance with the present invention.

In one embodiment, a variable reluctance is introduced by pole notches formed in internal stator shoes. Owing to the variable reluctance and asymmetric magnetic field distribution, the rotor PM will detent off axis, i.e., a phase shift in detent torque. Also, mutual torque will be phase shifted owing to reorientation of the magnetic poles of the stator by "removal" of mass for forming pole notches. Mutual torque is shifted in phase an amount which is different from the shift in phase of detent torque such that mutual and detent torque nulls do not coincide.

In another embodiment, slots are made in an internal stator. The slots are narrow, thus variable reluctance and magnetic field distribution effects are small, i.e., small phase shift, if any, in detent torque. However, the slots create saturation regions in the stator shoes, such that flux distribution is asymmetrical, i.e., significant phase shift of mutual torque.

In another embodiment, complete portions of the stator shoes are omitted. Thus, magnetic field distribution about the stator tooth is asymmetrical. This causes phase shifts in both detent and mutual torques.

In another embodiment, four slots are provided in the stator. In one of the four slot embodiments, additional starting poles are symmetrically disposed about the stator tooth; and in another four slot embodiment, additional starting poles are asymmetrically disposed about the stator tooth. In both of these embodiments, the PM is radially magnetized causing magnetic flux to flow in the starting poles. Consequently, mutual torque is phase shifted. In the asymmetrically disposed starting poles embodiment, both detent and mutual torques are phase shifted.

A starter coil may be added onto the additional starting poles of the four slot embodiments. The starter coil may be used for starting a single-phase PMDC motor independent of any shift from detent torque nulls. In other words, no detent torque is needed to start the motor, and consequently the motor may be started when positioned at a detent torque null location. The starter coil may also be used for sensing back electromotive force (emf) nulls, i.e., "zero crossings."

Using, the starter coil, the motor of the present invention may be brought up to speed by open loop control, e.g., with an appropriate timed ramp for drive pulses, or a closed loop control, e.g., sensing back electromotive force (emf).

In other embodiments the rotor PM is magnetized with magnetic anomalies. The magnetic anomalies introduce both mutual and detent torque phase shifts.

In other embodiments, the stator is made in two pieces to optimized the distance between pole pieces. Moreover, winding the stator coil is simplified for manufacturing purposes.

In other embodiments, the stator is external. The external stator embodiment may also include an internal stator. The motor magnetic circuit (a combination of a coil and a section of the stator core) of the external stator embodiment may be extended to a printed circuit board (PCB) for direct coupling to motor drive electronics. The coil may be wound onto a section of the stator, which in turn is attached to a PCB.

The stator may be made of solid steel, laminated steel, laminated sheets of steel insulated from one another, and like media. However, other media suitable for conducting magnetic flux may be used. Also, the molecules comprising the magnetic media may be oriented for improved flux carrying capacity and detent torque characteristics. Molecular orientation of magnetic materials is known in the art, and thus a discussion of same is omitted in order to avoid confusion while enabling those skilled in the art to practice the claimed invention.

Other features of the present invention are disclosed or apparent in the section entitled "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawing.

Figure 1:
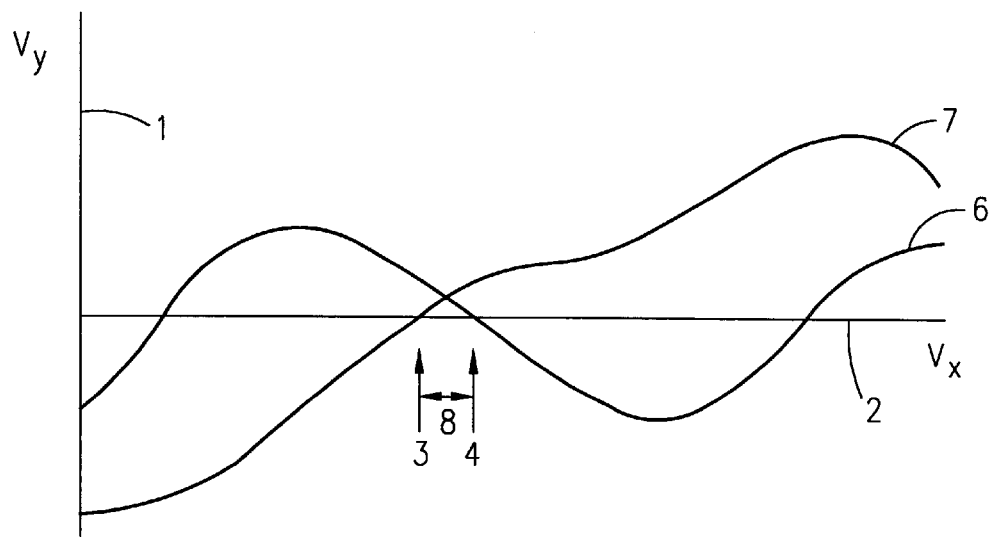
FIG. 1 is a graphical representation of starting and detent torques where an offset angle has been introduced between the two torques.

Reference numbers refer to the same or equivalent parts of the present invention throughout the several figures of the drawing.

BEST MODE FOR CARRYING OUT THE PRESENT INVENTION

Introduction

Referring to FIG. 1, there is shown a graphical representation of mutual torque voltage 7 and detent torque voltage 6 plotted as y-coordinate voltage, axis 1, versus x-coordinate voltage, axis 2. It should be understood that mutual torque voltage is directly proportional to current delivered to a motor, whereas detent torque is inherent, i.e., not affected by application of current. As shown, an offset angle 8 (phase shift) exists between starting torque voltage 7 and detent torque voltage 6. Thus, detent torque null 4 and starting torque null 3 do not coincide. Thus, for all orientations of a PM rotor there will exist starting torque, whether mutual torque, detent torque, or a combination of both, capable of being delivered the single-phase PMDC motor in accordance with the present invention.

As the present invention relates to single-phase, brushless PMDC spindle motors for use in hard disc drives, a more detailed understanding of the background art of spindle motors is appropriate.

Background

Figure 2A:
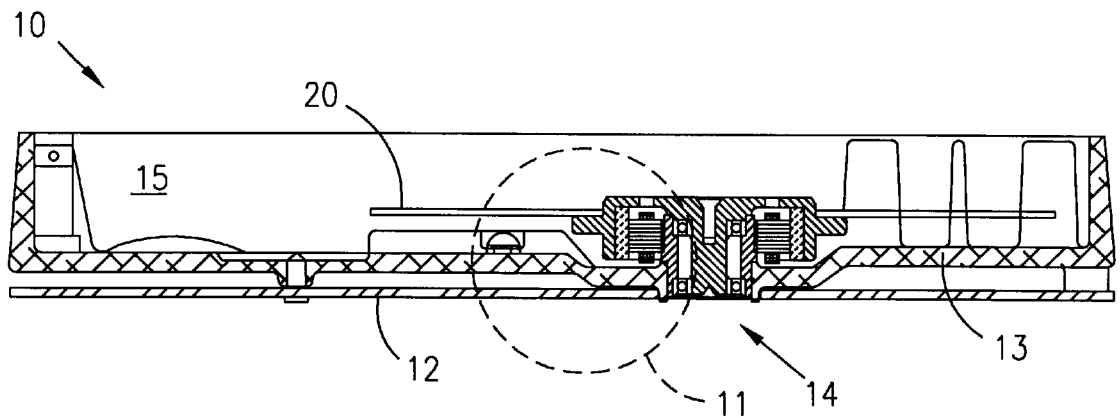
FIG. 2A is a side view in cross-section of a prior art hard disc drive.
Figure 2B:
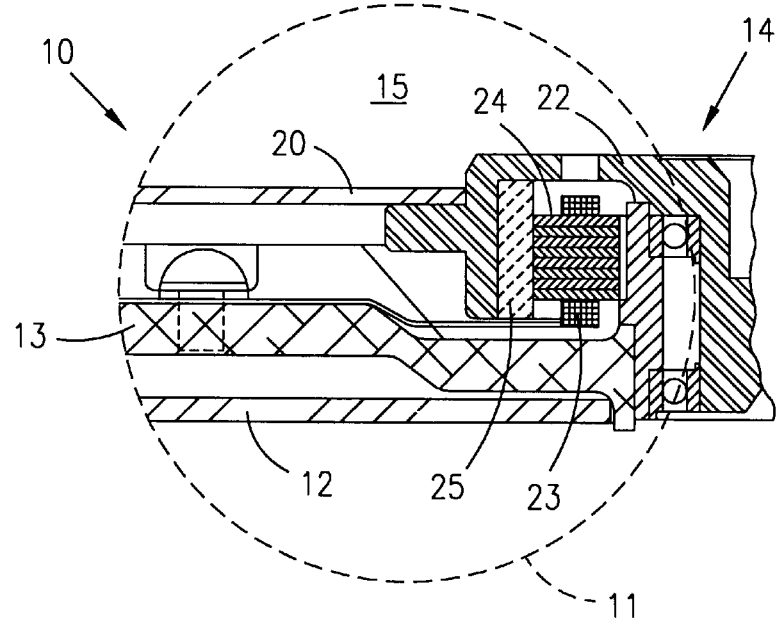
FIG. 2B is an enlargement of a portion of the hard disc drive of FIG. 2A.

In FIG. 2A, a cross-section of a prior art hard disc drive 10 is shown, of which an enlarged view of circled region 11 is shown in FIG. 2B.

Referring to FIG. 2A, hard disc drive 10 includes base casting 13, driver board 12, and spindle motor 14. Spindle motor 14 is located in drive volume 15 and attached to base casting 13.

Now referring to FIG. 2B, permanent magnet 25 is connected to rotor 22, and stator coil 23 is wrapped around stator core 24 and connected to drive circuits (not shown). Torque for spinning rotor 22 and magnet 25 is created by applying current to coil 23 to induce magnetic flux. The magnet flux between rotor magnet and stator coil poles cause the rotor to spin. Depending on the initial-starting orientation of rotor magnet and stator coil poles, the rotor may spin clockwise (CW) or counter-clockwise (CCW) upon motor start-up.

In spindle motor applications, it is critical that the rotor spin the same direction each time for writing or reading information to or from one or more discs, e.g., disc 20. Therefore, the magnetic orientation of poles of the rotor and stator must be known from the start. In brushless motors, indirect means such as sensors or detectors are used for determining the magnetic orientation of the poles, i.e., determining the position of magnetic poles of magnet 25 attached to rotor 22. By employing such sensors or detectors, it is possible to energize the stator coil in such a manner that the rotor spins the same direction every time. Other means for detecting the position of the rotor for causing the motor to spin the same direction each time are described in U.S. Pat. No. 5,028,852, issued to John C. Dunfield, one of the listed inventors, and incorporated by reference as though fully set forth herein.

Before proceeding with a detailed description of the present invention as applied to a spindle motor, it should be understood that the principles of the present invention may be adapted for use with a variety of different systems other than hard disc drives.

Two Pole Notch Embodiments

Figure 3B:
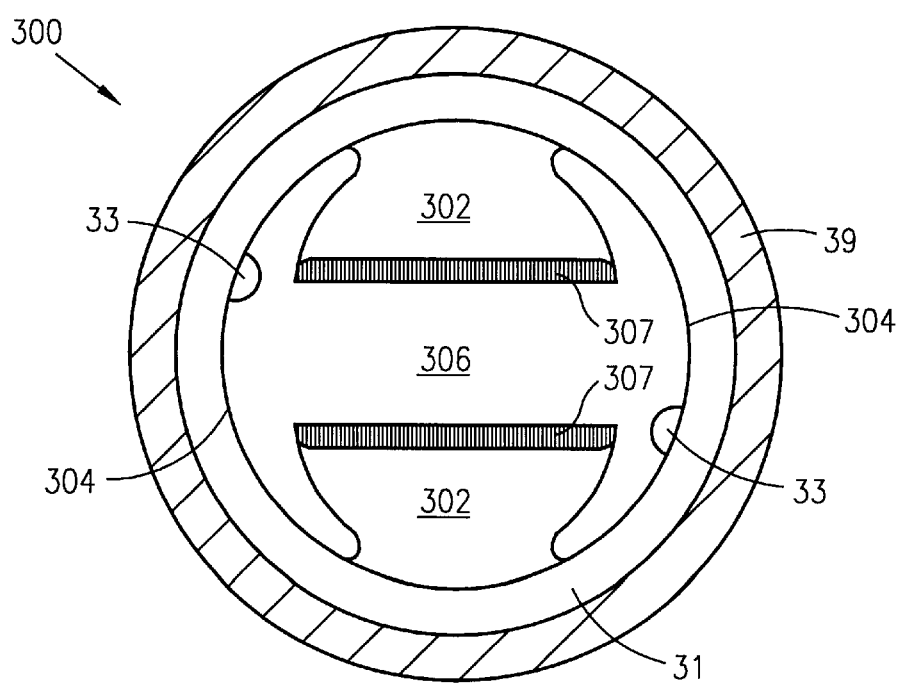
FIG. 3B is a top exposed and partial cross-section view of a portion of an alternate embodiment of a single-phase motor in accordance with the present invention.
Figure 3A:
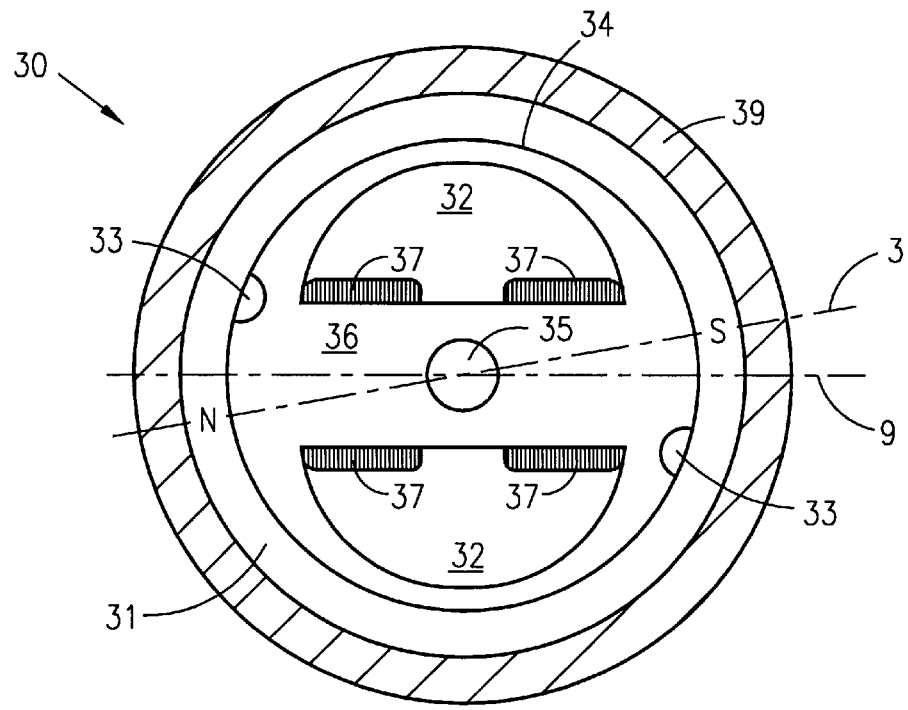
FIG. 3A is a top exposed and partial cross-section view of a portion of a single-phase motor in accordance with the present invention.

Referring to FIG. 3A, there is shown a top exposed and partial cross-sectional view of a portion of a motor 30 constructed in accordance with the principles of the present invention. Although portions of rotor 39 and coil 37 are not shown in FIG. 3, it should be understood that: rotor 39 covers magnet 31, stator 36, and coil 37 in a similar fashion as does rotor 22 of FIG. 2B; and coil 37 is wrapped around stator 36, avoiding rotor shaft or bearing opening 35, essentially forming a parallel electromagnetic circuit. Opening 35 is optional, and depends upon configuration of motor 30. It should be understood that in this type of internal stator configuration, magnet 31 is attached to rotor 39 and revolves around the stator during operation of the motor. Air gap 34 is created between stator 36 and magnet 31 and is the space between the outer diameter of stator 36 and the inner diameter of magnet 31. It should further be understood that magnet 31 may be replaced with more than one magnet.

Two openings 32 are formed in stator 36, as well as two pole notches 33. While two pole notches 33 are illustrated, it should be understood that one or more pole notches 33 may be employed in accordance with the present invention. However, in a one pole notch 33 configuration (not shown), there would be torque asymmetry about 180 degrees, and consequently such a configuration may not be desirable.

Openings 32 and pole notches 33 form air gaps in stator 36. Reluctance depends in part on the geometry of the air gaps. In stator 36, openings 32 increase the reluctance. Also, the reluctance is increased at pole notches 33 as compared to other locations along air gap 34.

Owing to the asymmetry introduced by pole notches 33, magnet 31 will detent asymmetrically about the tooth of stator 36, as indicated by north, N, and south, S, poles of magnet 31 being distributed on either side of central stator axis 9. Thus, rotor 39 will detent such that magnetic mass of stator 36 is approximately evenly distributed, i.e., poles of magnet 31 will align with magnetic mass center line 3. Because magnet 31 detents off axis 9, detent torque null locations of motor 30 do not coincide with mutual torque null locations. Consequently, an offset angle is introduced between mutual and detent torques. The amount of this offset angle is proportional to the amount of asymmetry introduced by pole notches 33. The more magnetic mass "removed" from stator 36 to provide pole notches 33, the greater the offset angle introduced.

Additionally, magnet 31 may be magnetized to enhance the amount of offset angle. For example, magnet 31 may be radially or diametrically magnetized. The effect of radial magnetization versus diametrically magnetization will depend on stator 36 geometry, as the angle at which magnetic flux of magnet 31 impinges the contour of stator 36 will effect the offset angle.

For radial magnetization, it is preferable to use an anisotropic magnetically permeable material, and for diametrically magnetization, it is preferable to use an isotropic magnetically permeable material. Radially magnetized magnets include S32H from TDK and SAM17R from Seiko Epson. Diametrically magnetized magnets include Neom11 from TDK or Diado.

Referring to FIG. 3B with continuing reference to FIG. 3A, there is shown a top exposed and partial cross-sectional view of a portion of a motor 300 constructed in accordance with the principles of the present invention. Motor 300 is similar to motor 30, except that stator 306 is shaped differently than stator 36. Also, opening 35 has been omitted. Because stator 306 is of a different shape that stator 36, slots 32 and air gaps 34 are different than those of motor 30. However, the principles of operation as described with respect to motor 30 also apply to motor 300.

Saturation Slot Embodiment

Figure 4:
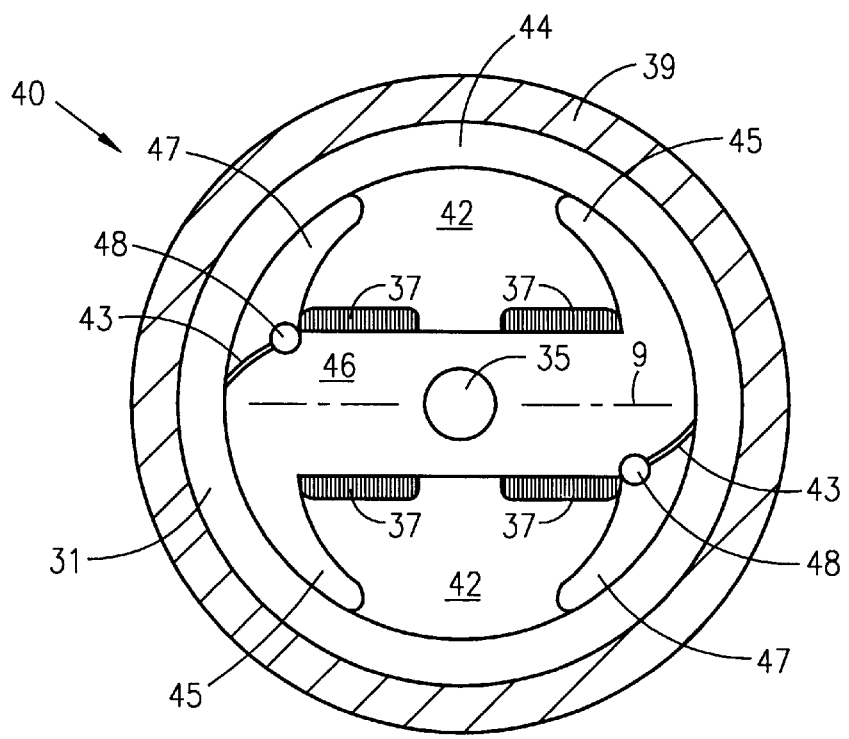
FIG. 4 is a top exposed and partial cross-sectional view of a portion of a two slot version of a single-phase motor in accordance with the present invention.

Now referring to FIG. 4, there is shown a top exposed and partial cross-sectional view of a portion of an alternate embodiment of a motor 40 constructed in accordance with the principle of the present invention. Again, portions of rotor 39 and coil 37 have been omitted. However, it should be understood that coil 37 is wrapped around the tooth of stator 46, avoiding opening 35.

Asymmetrical air gaps are created between stator 46 and magnet 31 by slots 43 and 42. Air gaps are also created by the difference between the outer diameter of stator 40 and the inner diameter of magnet 31, e.g., air gaps 44. Slots 43 cut through laminations of stator 46 alter the flux paths. While this "removal" of mass from stator 46 may provide some off axis 9 detent, owing to the limited amount of mass removed and the narrowness of slot 43 there will be little impact on shifting the detent position of magnet 31. However, the change to mutual torque will be significant. Slots 43 create localized saturation regions 48 in stator 46 (when excited). Regions 48 are narrow, thus creating a magnetic flux "bottleneck" when stator 46 is excited. Consequently, not all the flux is able to travel through region 48 for even distribution about the stator shoes. Some flux is thus diverted away from the slotted regions 47 of the stator shoes toward the non-slotted regions 45 of the stator shoes. As the magnetic flux cannot evenly distribute, it effectively appears as an asymmetrical distribution of magnetic field of stator 46. Thus, creating a offset angle between detent and mutual torques sufficient for providing starting torque for any orientation of magnet 31.

Again, while two slots 43 are illustrated, it should be understood that one or more slots 43 may be employed in accordance with the present invention. However, in a one slot 43 configuration (not shown), there would be torque asymmetry about 180 degrees, and consequently such a configuration may not be desirable.

Figure 4A:
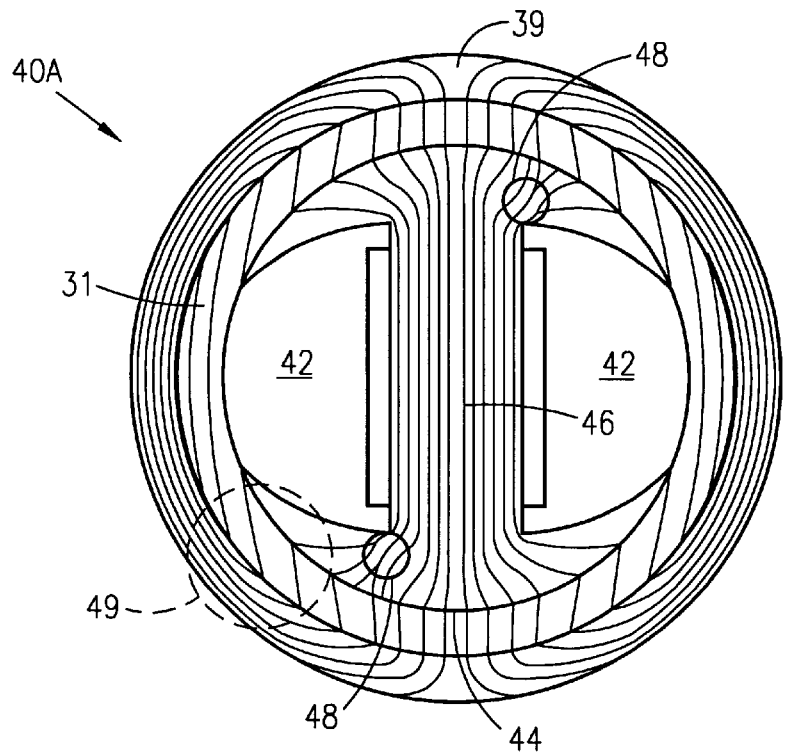
FIG. 4A shows magnetic flux lines based on a finite element analysis for an diametrically magnetized magnet for the motor of FIG. 4.

Referring to FIG. 4A, a diagram 40A shows the results of a finite element analysis for the motor 40 of FIG. 4, indicating flux lines 49 of a magnetic field for stator 46, rotor 39 and magnet 31 at a rest position. Flux lines 49 along magnet 31 indicate diametrical magnetization in FIG. 4A, but the same principles would apply if magnet 31 had been radially magnetized.

Flux lines 49 indicate localized saturation regions 48 corresponding to slots 43 of FIG. 4. While shaping of flux lines 49 is shown for the top of stator 46, this shaping equally applies to the bottom of stator 46.

Asymmetrical Shoe Embodiment

Figure 5:
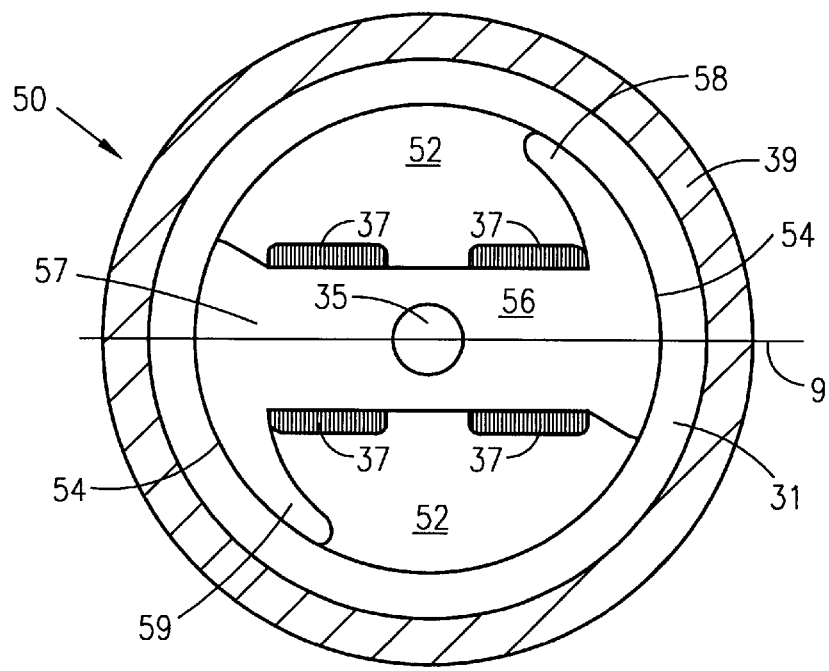
FIG. 5 is a top exposed and partial cross-sectional view of an alternate embodiment of a portion of a two slot version of a single-phase motor in accordance with the present invention.

In FIG. 5, there is shown a top exposed and partial cross-sectional view of a portion of an alternate embodiment of a motor 50 constructed in accordance with the principles of the present invention. Again, portions of rotor 39 and coil 37 have been omitted. However, it should be understood that coil 37 is wrapped around the tooth of stator 56, avoiding opening 35. Air gaps are created between stator 56 and magnet 31 by slots 52 in stator 56, as well as the difference between the outer diameter of stator 56 and the inner diameter of magnet 31, e.g., air gaps 54.

In motor 50, stator shoes 58 (or pole arcs) are asymmetrical about stator tooth 57, and the magnetic field distribution is asymmetrical about axis 9. This results in a offset angle between mutual and detent torques sufficient for providing starting torque at any position of magnet 31.

Figure 5A:
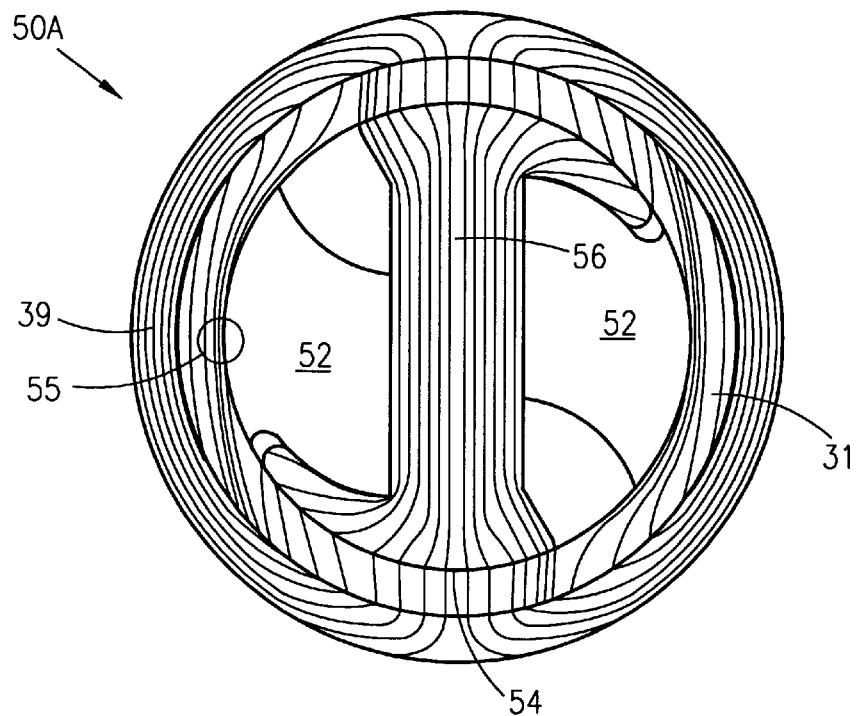
FIG. 5A shows magnetic flux lines based on a finite element analysis for an radially magnetized magnet for the motor of FIG. 5.

Referring to FIG. 5A, a diagram 50A shows the results of a finite element analysis of the motor 50 of FIG. 5, indicating lines of flux of a magnetic field for stator 56, rotor 39 and magnet 31 at a rest or start position. Flux lines 55 in FIG. 5A indicate that magnet 31 is diametrically magnetized, but the same principles would apply if magnet 31 had been radially magnetized. While this shaping of the lines of flux is shown for the top of stator 56, the same shaping of the flux occurs at the bottom of stator 56. Notably, diametrical magnetization of magnet 31 will enhance facilitation of the offset angle.

Four Slot Embodiments

Figure 6:
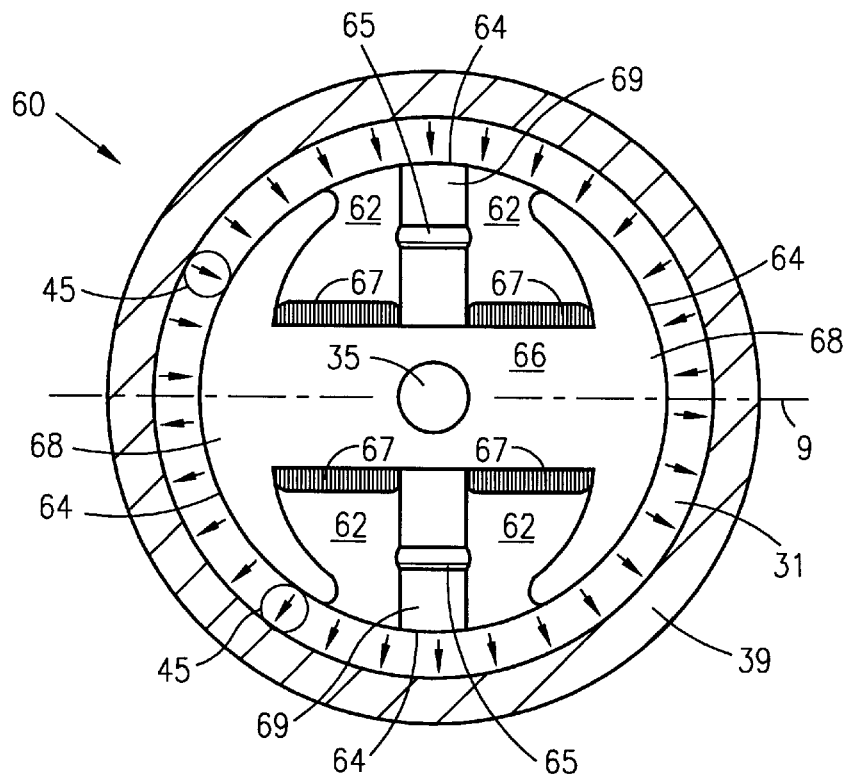
FIG. 6 is a top exposed and partial cross-sectional view of a portion of a four slot version of a single-phase motor in accordance with the present invention.
Figure 7:
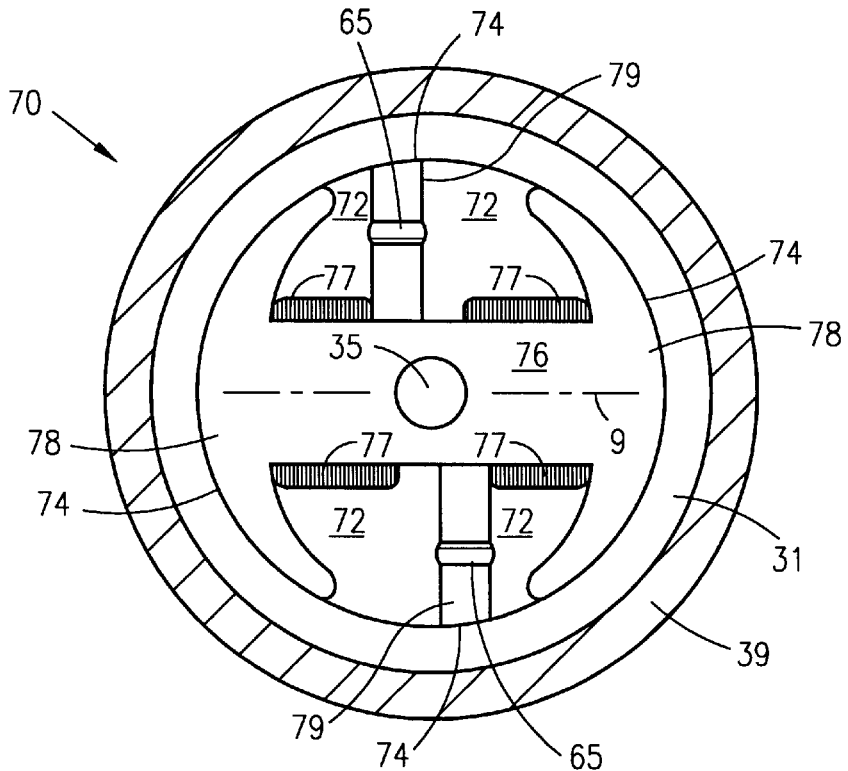
FIG. 7 is a top, exposed view of an alternate embodiment of a four slot version of a portion of a single-phase motor in accordance with the present invention.

In FIGS. 6 and 7, there are shown four-slot versions of a single-phase motor in accordance with the present invention.

Referring to FIG. 6, there is shown a top exposed and partial cross-sectional view of a portion of an alternate embodiment of a motor 60 in accordance with the present invention. Again, a portion of rotor 39 has been omitted. Also, a portion of coil 67 has been omitted. However, it should be understood that coil 67 is wrapped around the tooth of stator 66, avoiding opening 35.

Air gaps are created between stator 66 and magnet 31 by four slots 62 in stator 66, as well as the difference between the outer diameter of stator 66 and the inner diameter of magnet 31, e.g., air gaps 64.

Magnet 31 is radially magnetized as indicated by arrows 45. While mass distribution will be symmetrical about axis 9, radially magnetic flux flows to poles 68, as well as additional starter poles 69, of motor 60. When current is applied to coil 67 of motor 60, a four pole electromagnetic stator is created. As poles 69 do not have corresponding opposite poles to align with (i.e., poles 68 are aligned to magnetic poles of magnet 31), poles 69, when electromagnetized, will tend to align with poles of magnet 31. Thus, a starting torque for motor 60 is present.

Start on Mutual Torque Only No Detent Torque, Embodiment

In another approach to starting motor 60, starter winding 65 is fitted around poles 69 of stator 66. In this embodiment an additional phase is added to poles 69 of motor 60. As starter winding 65 is only energized momentarily it may comprise a large number of turns of a fine wire to produce a starting torque, as well as suitable voltage for sensing.

Starter winding 65 has sufficiently large number of turns for providing sufficient starting torque to overcome internal motor frictions, as well as move the rotor. As starter winding 65 will have a high resistance and a high back emf constant, a starting torque can be achieved with the application of only a small amount of current to winding 65. Moreover, as starter winding 65 can supply a starting torque, either winding 65 or coil 67 may be excited for detenting motor 60. In other words, coil 67 may be excited in order to position magnet 31 for starting motor 60 with winding 65. Or, winding 65 may be excited in order to position magnet 31 for starting motor 60 by exciting coil 67.

The method of starting motor 60 with winding 65 may first encompass attempting to start motor 60 prior to applying current to winding 65. If motor 60 failed to start (i.e., rotor 39 is at a zero detent torque position), winding 65 may be excited to start motor 60. Because phase of winding 65 is at quadrature (shifted π/4 radians or 90 electrical degrees) with phase of coil 67, when coil 67 is at minimum torque, winding 65 is at maximum torque. Alternatively, both coil 67 and winding 65 may be energized for starting motor 60. Motor 60 may be run off coil 67 once started, and winding 65 may then be de-energized.

Therefore, it should be understood that employing winding 65 differs completely from using detent torque to start a single-phase PMDC motor. No detent torque is needed to start motor 60, rather motor 60 may be started off mutual torque only. Mutual torque nulls are avoided by using either winding 65 or coil 67 to start motor 60.

Back EMF Sensing Using Starter Coil

Normally, winding 65 would over heat owing to its high resistance; however, because winding 65 is only current driven for a short time this is not a problem. Therefore, winding 65 may include a large number of turns of a fine wire (or suitably dimensioned wire for the working volume).

The number of turns may be such that the back emf voltage induced across winding 65 would ultimately exceed the power supply voltage, if winding 65 were excited up to full speed. Yet because winding 65 is only energized for a short period of time, the rotor velocity is not too high and the back emf voltage never reaches a point at which motor 60 could not be operated. The flux change with respect to time for the slight rotation to start motor 60 does not produce back emf voltage sufficient to overcome the power supply.

However, because winding 65 is provided with a large number of turns, the back emf voltage induced across its many turns supplies sufficient voltage for sensing back emf without any current supplied to winding 65 from a power supply, while coil 67 is driven.

Figure 14:
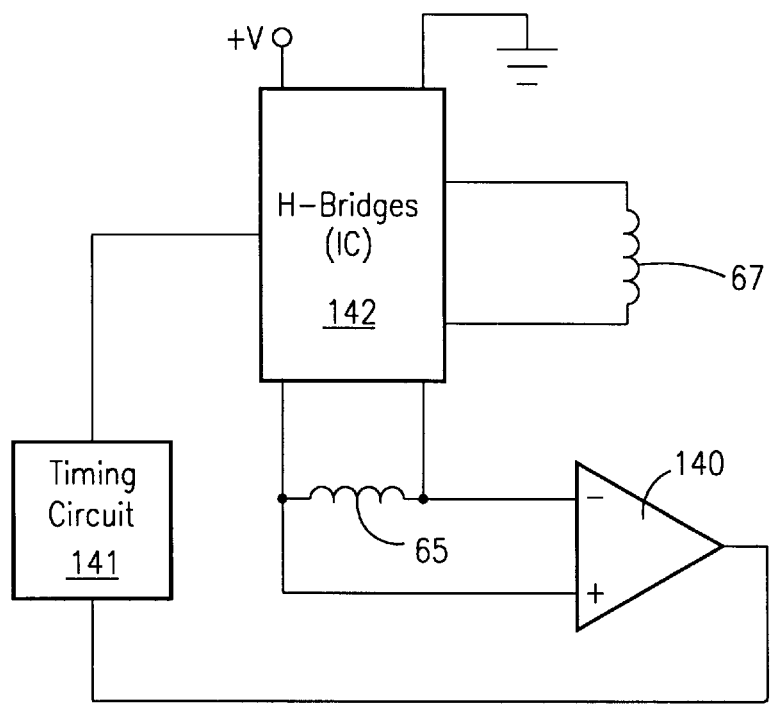
FIG. 14 is a circuit diagram in accordance with the present invention for starting a motor and sensing back emf in accordance with the present invention.

A circuit analog for driving motor 60 is shown in FIG. 14. As shown in FIG. 14, an H-bridge integrated circuit (IC) 142 is implement. The H-bridge IC 142 may be an L298 SGS. Coil 67 is coupled to an H-bridge of IC H-bridge 142 as well as is winding 65. Winding 65 is also coupled in parallel to comparator 140. The output of comparator 140 is coupled to timing circuit 141, whose output is coupled to H-bridge IC 142. This implementation allows full two-phase operation and is only one implementation of a circuit in accordance with the present invention. Alternatively, switching circuits other than an H-bridge may be employed in accordance with the principles of the present invention. For example, winding 65 may be energized, with current being switched on and off through a single transistor, for producing starting torque in a single-phase manner.

Commutation of a single-phase motor occurs after back emf crossings, i.e., zero crossings. Thus, the current supplied to the motor must be turned off prior to a back emf crossing and turned back on after the back emf crossing. Winding 65 may be used for sensing these zero crossings.

As magnet 31 (shown in FIG. 6) is rotated, current is induced in winding 65. the current will have a positive or negative direction depending on the passing polarity of magnet 31 (shown in FIG. 6). Thus, voltage across winding 65 will change from positive to negative. The voltage across winding 65 is the input voltage to comparator 140. As comparator 140 is configured as a zero crossing detector, each time the voltage across winding 65 changes, comparator 140 output will change or toggle. Each change in sign of voltage across winding 65 corresponds to a back emf zero crossing location.

Timing circuit 141 may be implemented to turn current on and off, through an H-bridge of IC 142, to coil 67 with the toggling of the output of comparator 140, allowing for quadrature shift. Thus, winding 65 may be used to sense back emf crossings for turning current on and off as applied to coil 67.

Figure 20:
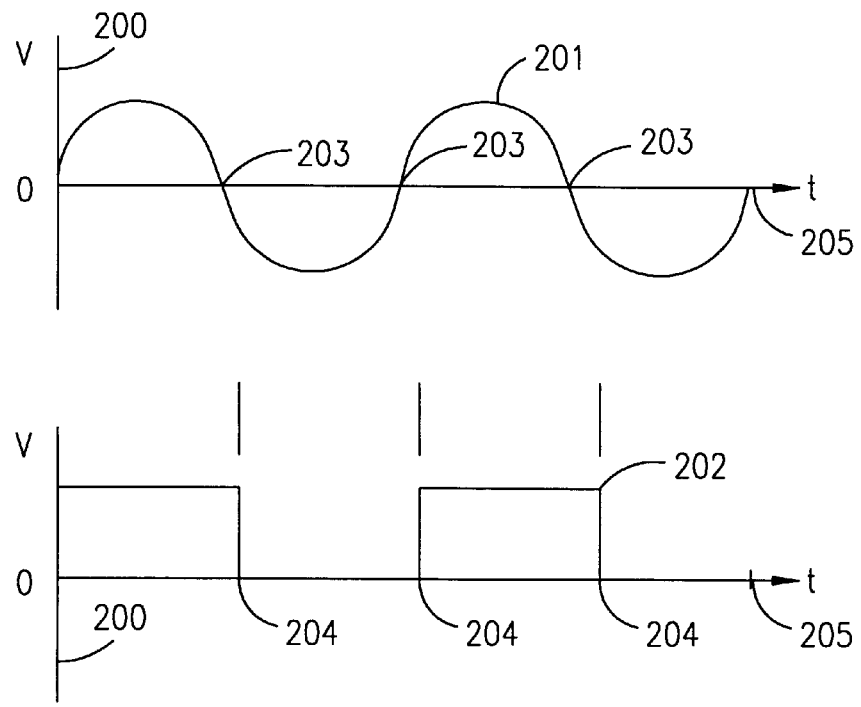
FIG. 20 is a graphical representation of back emf voltage and encoder voltage.

Referring now to FIG. 20, there are shown graphical representations of back emf voltage 201 and encoder voltage 202. Back emf voltage 201 is shown plotted on voltage axis 200 versus time axis 205, as is encoder voltage 202. Back emf voltage 201 represents the induced voltage across starter winding 65 (shown in FIG. 6), when starter winding 65 (shown in FIG. 6) is not supplied current by the power supply. Encoder voltage 202 represents an output of comparator 140 (shown in FIG. 14) corresponding to induced back emf voltage 201. Because back emf voltage 201 indicates zero crossings 203, encoder voltage produces commutation "crossings" 204.

As explained above, it is necessary to determine what polarity of current must be initially applied to the motor for causing the desired direction of rotation, e.g., positive torque. If the desired direction of rotation is not achieved, the polarity of current supplied to the motor may be reversed to produce positive torque.

Figure 21:
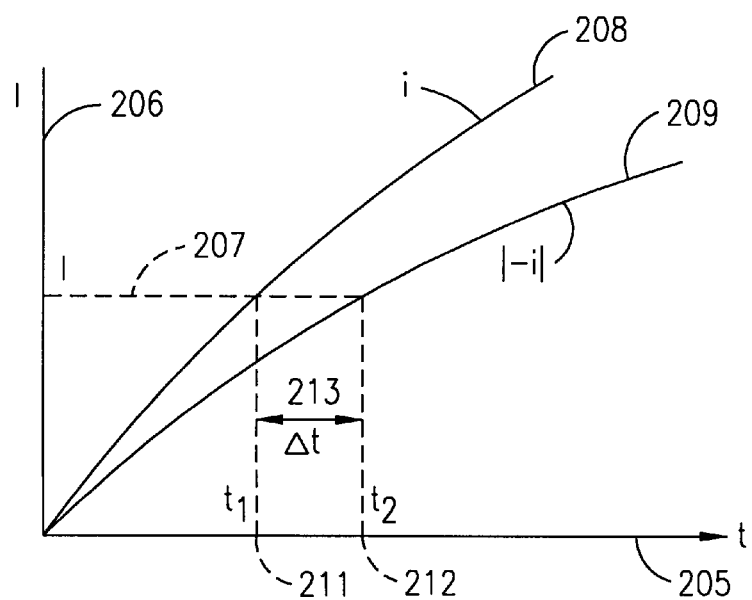
FIG. 21 is a plot of current rise versus time for a brushless PMDC motor.

Referring now to FIG. 21, there is shown a graphical representation of current rise verses time for a single-phase, brushless, PMDC motor. Referring to FIGS. 6 and 7 with continuing reference to FIG. 21, either winding 65 or coil 67, 77 may be used for sensing rise time difference.

For example, in a single-phase application, winding 65 is supplied with a positive current followed by a negative current. Using application of differing polarities of current, the proper current direction may be determined for producing positive torque by defining a fixed current threshold 207 along current axis 206. Using threshold 207, it is possible to measure current rise times for each application of current to winding 65. Curve 208 represents application of positive polarity current to starter winding 65. Curve 209 represents application of negative polarity current (absolute value thereof) to starter winding 65. Time 211 is the point at which threshold current 207 is reached along positive current curve 208. Time 212 is the point at which threshold current 207 is reached along negative current curve 209. The sign of time difference 213 is characteristic of the direction of rotation of motor 60 or 70. Thus, time difference 213 may be used to set polarity of current supplied to motor 60 or 70 to cause positive torque (i.e., where emf and current polarities are the same).

A processing means, such as a microprocessor or other suitable processor, may be employed in timing circuit 141 (shown in FIG. 14) for determining time difference 213. Also, timing circuit 141 (shown in FIG. 14) may include any of a variety of well known memory means, such as random access, read only, flash, or like memory, to record times 211, 212. Again, referring to FIG. 14, it should be understood that commutation is controlled in a closed loop manner. However, the present invention may also commutate with open loop control.

Figure 22:
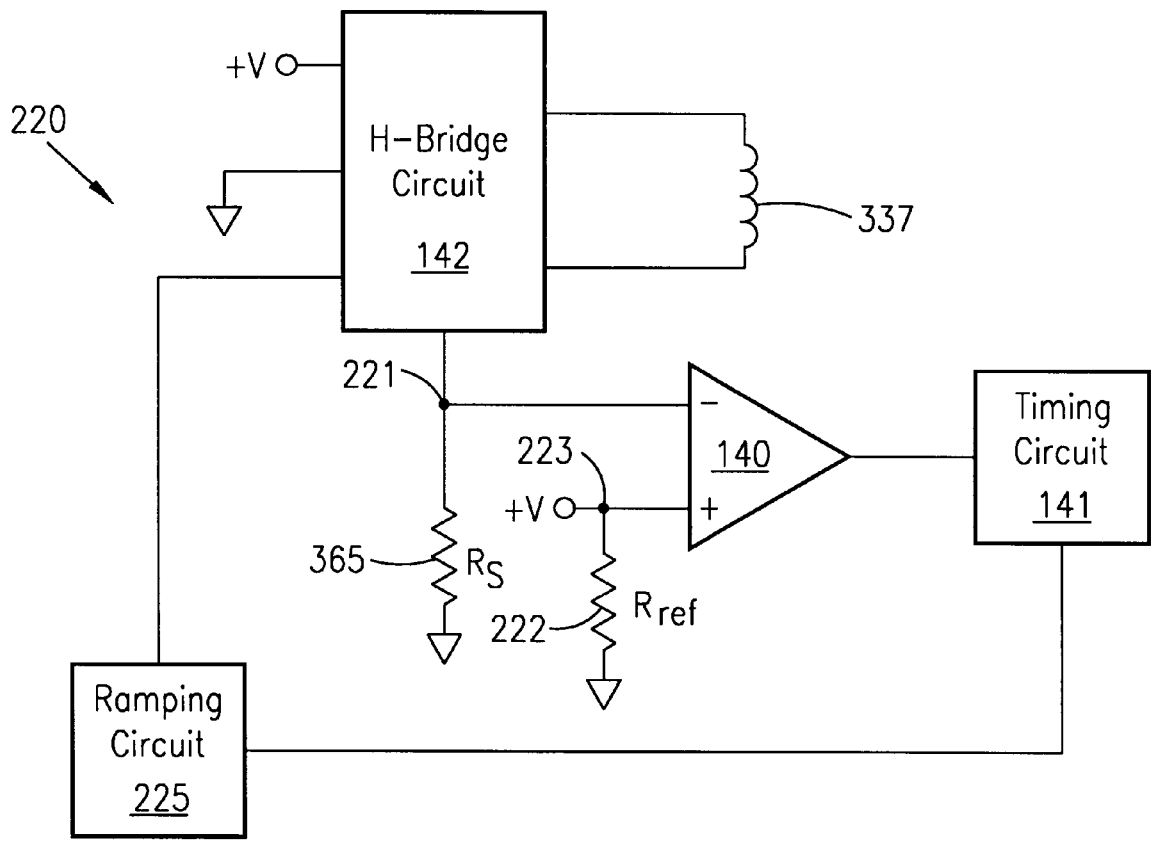
FIG. 22 is a circuit diagram for open loop control in accordance with the present invention.

Referring to FIG. 22, there is shown a circuit analog for driving a motor under open loop control. In circuit 220, sensor voltage (as represented by sensor resistor 365) appears at node 221. Resistor 365 is in series with coil 337 (e.g., coil 67 shown in FIG. 6) being excited for receiving applied current. Thus, current supplied to coil 337 will produce a voltage at node 221. Voltage at node 221 is input to comparator 140 for comparison with reference voltage appearing at node 223 for toggling output of comparator 140. Sensing voltage at node 221 for comparison with a reference voltage at node 223 allows back emf zero crossings to be determined for purposes of commutation.

Again referring to FIG. 21, sign of time difference 213 indicates direction of rotation of rotor magnet (e.g., magnet 31 of motor 60 shown in FIG. 6). Moreover, magnitude of time difference 213 may be used to determine the location of a rotor magnet. In other words, the magnitude of time difference 213 may be used to determine where, in the positions between zero crossings, e.g., commutation crossings 204 (shown in FIG. 20), a magnet (e.g., magnet 31 shown in FIG. 6) is located. Thus, the time interval between the next commutation crossing and between subsequent commutation crossings may be determined such that current may be supplied to a motor (e.g., motor 60 shown in FIG. 6) in the form of a "timed" ramp drive pulse.

Figure 23:
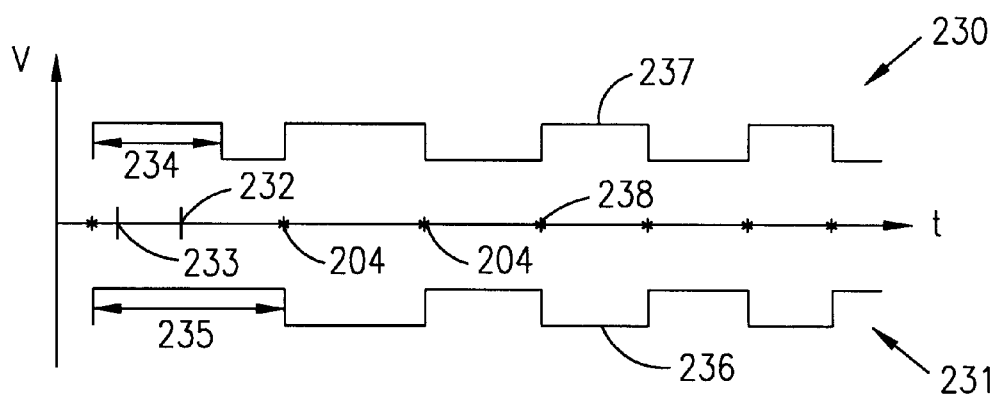
FIG. 23 are graphic illustrations of two examples of signals having different starting locations.

Referring to FIG. 23, there is shown a graphical representation of an output of comparator 140 of circuit 220 (shown in FIG. 22). Two cases are shown, namely, case 230 and case 231. In case 230, a motor (e.g., motor 60 shown in FIG. 6) has a starting location 232, resulting in time difference 234. In case 231, a motor (e.g., motor 60 shown in FIG.

6) has a starting location 233, resulting in time difference 235. Time difference 235 is larger than time difference 234, as signal 230 must travel farther than signal 237 for encountering a first commutation crossing 204. At approximately location 238, normal acceleration takes hold. Thus, a timed ramp drive pulse may be based upon total torque (T) per second moment of inertia (J), i.e., acceleration (T/J).

Referring again to FIG. 22, therefore, timing circuit 141 pulses ramp circuit 225 for supplying current to coil 67 through H-bridge circuit 142. The duration of the time between pulses from timing circuit 141 depends on the location of magnet 31 (shown in FIG. 6).

Asymmetrical Four Slot Embodiment

Now referring to FIG. 7, there is shown a top exposed and partial cross-sectional view of a portion of an alternate embodiment of a motor 70 in accordance with the present invention. Again, a portion of rotor 39 has been omitted. Also, a portion of coil 77 has been omitted. However, it should be understood that coil 77 is wrapped around the tooth of stator 76, avoiding opening 35. Air gaps are created between stator 76 and magnet 31 by four slots 72 in stator 76, as well as the difference between the outer diameter of stator 76 and the inner diameter of magnet 31, e.g., air gaps 74.

Again, magnet 31 is radially magnetized. The same principles apply to motor 70, as those described with reference to motor 60 of FIG. 6 with one difference. Poles 79 are asymmetrically disposed about the tooth of stator 76. Consequently, the asymmetrically disposed starter poles 79, when electromagnetized, will tend to align more readily with the poles of magnet 31, as compared with poles 69 of motor 60 of FIG. 6 which are equidistant from the poles of magnet 31 at the start position. Also, poles 79 asymmetrically distribute magnetic mass about axis 9 of stator 76.

Optionally, motor 70 may be fitted with starter winding 65 around poles 79 of stator 76. Starter winding 65 operates in similar fashion as described herein with reference to motor 60 of FIG. 6.

Magnetic Anomalies Embodiments

Figure 8:
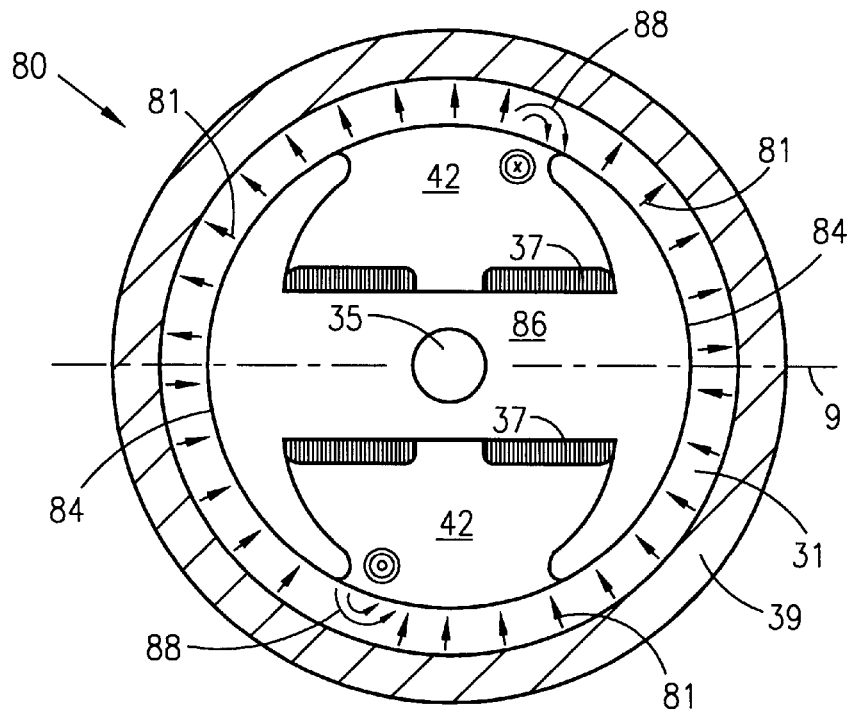
FIG. 8 is a top exposed and partial cross-sectional view of an alternate embodiment of a portion of a two slot version of a single-phase motor in accordance with the present invention having magnetic anomalies.
Figure 9:
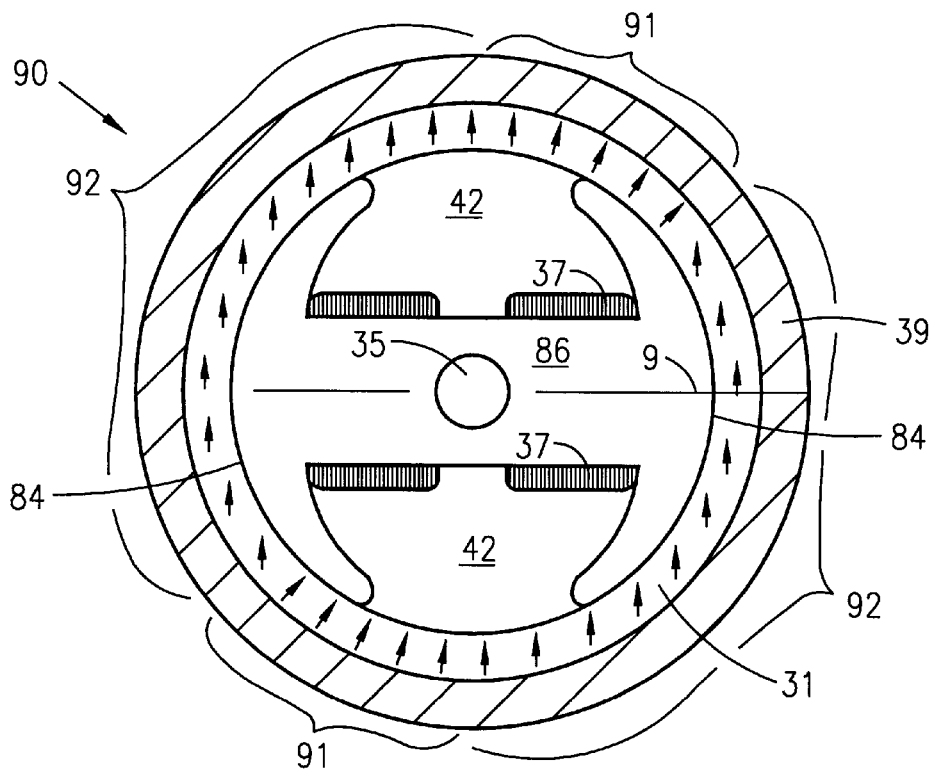
FIG. 9 is a top exposed and partial cross-sectional view of the alternate embodiment of the motor of FIG. 8 with different magnetic anomalies.

FIGS. 8 and 9 show alternate embodiments of motors in accordance with the present invention having magnetic "anomalies" introduced into the magnetization pattern of a permanent magnet. The anomalies are for providing a shift between detent torque and mutual torque.

Referring to FIG. 8, there is shown a top exposed and partial cross-sectional view of a portion of an alternate embodiment of a motor 80 in accordance with the present invention. Again, a portion of rotor 39 has been omitted. Also, a portion of coil 37 has been omitted. However, it should be understood that coil 37 is wrapped around the tooth of stator 86, avoiding opening 35.

Air gaps are created between stator 86 and magnet 31 by slots 42 in stator 86, as well as the difference between the outer diameter of stator 86 and the inner diameter of magnet 31, namely, air gaps 84.

While magnet 31 is radially magnetized to provide radial magnet flux, as indicated by arrows 81, magnet 31 may alternatively be diametrically magnetized in this embodiment. Magnet 31 also includes magnetic anomalies, as indicated by curved lines 88. These magnetic anomalies cause magnet 31 to align off axis 9. Consequently, a offset angle is introduced between mutual and detent torque of motor 80 such that torque nulls do not coincide.

Now referring to FIG. 9, there is shown a top exposed and partial cross-sectional view of a portion of an alternate embodiment of a motor 90 in accordance with the present invention. Again, portions of rotor 39 and coil 37 have been omitted. However, it should be understood that coil 37 is wrapped around the tooth of stator 86, avoiding opening 35.

Air gaps are created between stator 86 and magnet 31 by slots 42 in stator 86, as well as the difference between the outer diameter of stator 86 and the inner diameter of magnet 31, namely, air gaps 84.

Magnet 31 is radially magnetized, as indicated by arrows 91. Radial magnetization of magnet 31 is disposed about two opposing arc length sections along its circumference. Magnet 31 is also diametrically magnetized, as indicated by arrows 92, and such magnetization forms two opposing arc length sections along the circumference of magnet 31. In the embodiment shown, the radial magnetization sweeps through two 45 degree arcs, and the diametrical magnetization sweeps through two 135 degree arcs. However, the present invention is not limited to arcs of 45 and 135 degrees, and a variety of other angles may be used. In accordance with the present invention, anomalies may be introduced into a magnet using both radial and diametrical magnetizations.

Combining differing magnetizations in magnet 31 with stator 86 having laminations results in a saturation-induced magnetic field shaping effect. The saturation-induced magnetic field causes magnetic flux to be distributed unevenly. The magnetic anomalies (radial and diametrical magnetization) cause magnet 31 to align off axis 9, thus, introducing a offset angle to avoid coincidence of mutual and detent torque nulls.

While the embodiments of FIGS. 8 and 9 have been described with two anomalies each, it should be understood that the present invention may be practiced with fewer or more than two anomalies in magnet 31. Thus, one or more flux disturbances may be employed for providing a shift between detent and mutual torque.

Two Piece Stator Embodiments

Figure 15:
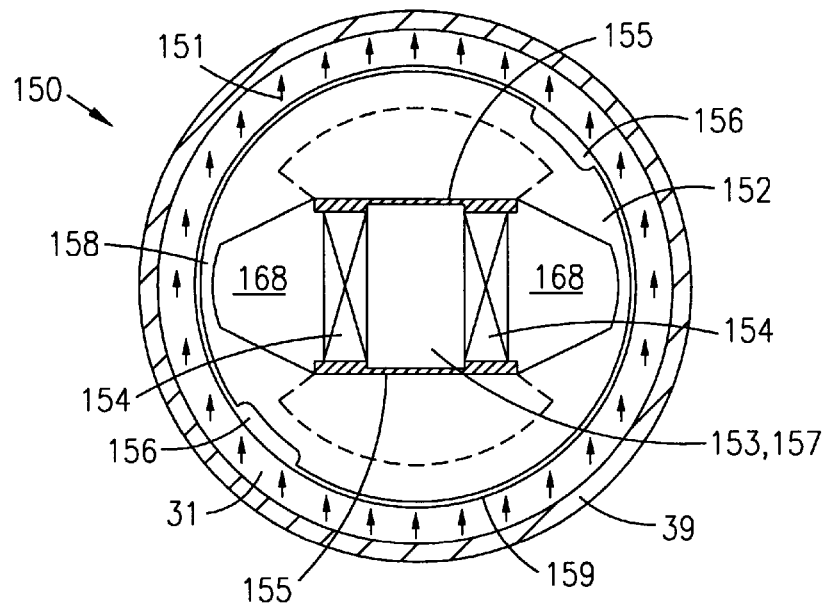
FIG. 15 is a top exposed and partial cross-sectional view of an alternate embodiment of a portion of a two piece stator single-phase motor in accordance with the present invention.

Referring now to FIG. 15, there is shown a top exposed and partial cross-sectional view of a portion of an alternate embodiment of a motor 150 in accordance with the present invention. As indicated by arrows 151, magnet 31 is diametrically magnetized. The stator of motor 150 is made up of two components, namely, stator pole piece 152 and stator coil body 153 or 157. One manner of introducing an offset angle between mutual torque and detent torque is to provide notches around the stator.

An introduced offset angle may be optimized by to reducing the distance between the pole pieces to zero. Consequently, motor 150 is built in two pieces, namely stator pole piece 152 and stator coil body 153 or 157. Motor 150 further includes coils 154 wound about bobbin 155. Coil 154 is wound onto stator coil body 153 or 157.

Figure 19:
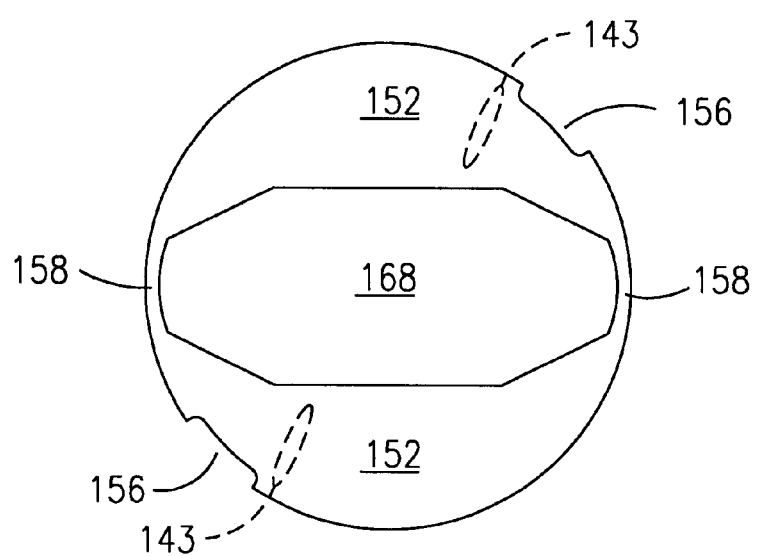
FIG. 19 is a top plan view of a stator pole piece of the motor of FIG. 15 in accordance with the present invention.

Referring to FIG. 19, there is shown a top plan view of stator pole piece 152. As shown, stator pole piece 152 includes slot (air gap) 168 and notches 156. Slot 168 creates two saturation regions 158 in stator pole piece 152. Saturation regions 158 become saturated with magnetic flux when motor 150 (shown in FIG. 15) is excited. The thin magnetic bridge forming saturation regions 158 should be in the range of lamination thickness, so that regions 158 are saturated approximately equivalent to air gap 159 shown in FIG. 15. Saturation regions 158 in combination with notches 156 introduce a offset angle between detent and mutual torques in order to avoid coincidence of torque nulls, such that there is starting torque for all positions which rotor 39 and magnet 31 (shown in FIG. 15) may be oriented.

Figure 18:
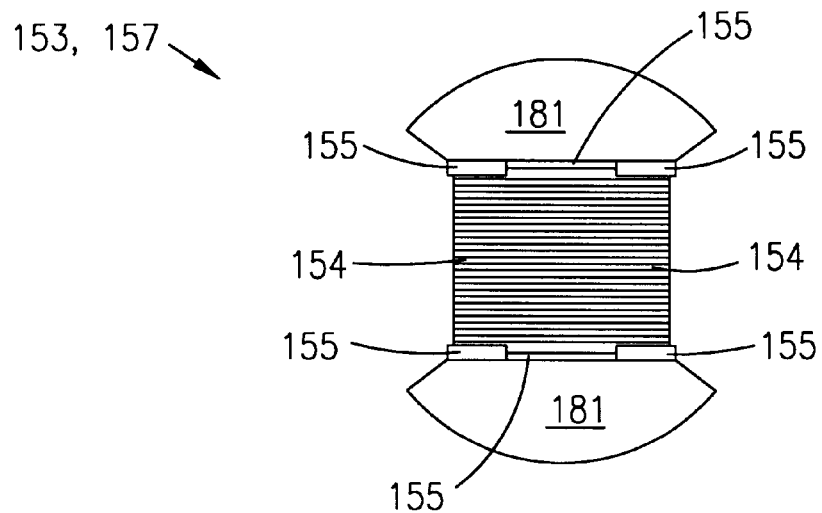
FIG. 18 is a top plan view of a stator coil body of the motor of FIG. 15 in accordance with the present invention.

Referring to FIG. 18, there is shown a top plan view of stator coil body 153, 157. As shown, coil 154 is wound around bobbin 155. Bobbin 155 is disposed on stator coil body 153 or 157 for this purpose. Stator coil body 153 or 157 also comprises poles 158. While poles 158 have arcuate stator shoe shapes for providing an expanded area for routing flux from stator coil body 153 or 157 to stator pole piece 152; however, it should be understood that stator coil body 153 or 157 need not be so shaped. In fact, stator coil body 153 or 157 may be shaped in any suitable manner allowing for it to be attached under stator pole piece 152 and support coil 154. Stator coil body 153 or 157 may be fixed under stator pole piece 152 by adhesive, glue, epoxy, soldering, or any other suitable known method of attachment. Because the stator of motor 150 (shown in FIG. 15) is made from two pieces, stator coil body 153 or 157 may have coil 154 wound thereon prior to attachment to stator pole piece 152. This allows for much simpler manufacturing as the wire comprising coil 154 does not have to be threaded through ends of slot 168 as shown in FIG. 15.

Figure 16:
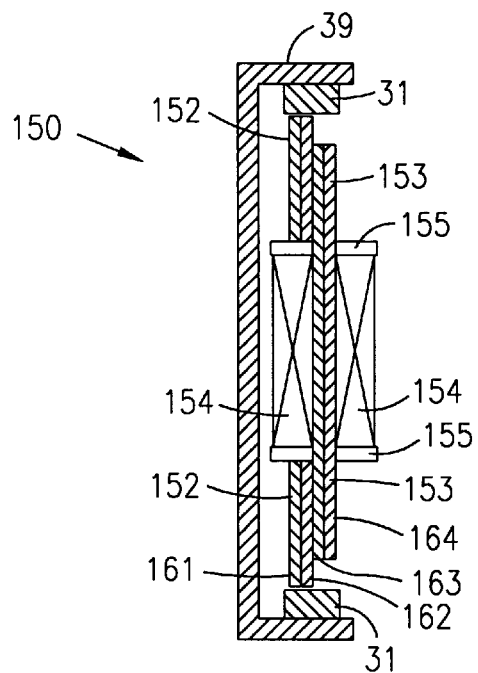
FIGS. 16 and 17 are cross-sectional views of alternate embodiments of the motor of FIG. 15 in accordance with the present invention.
Figure 17:
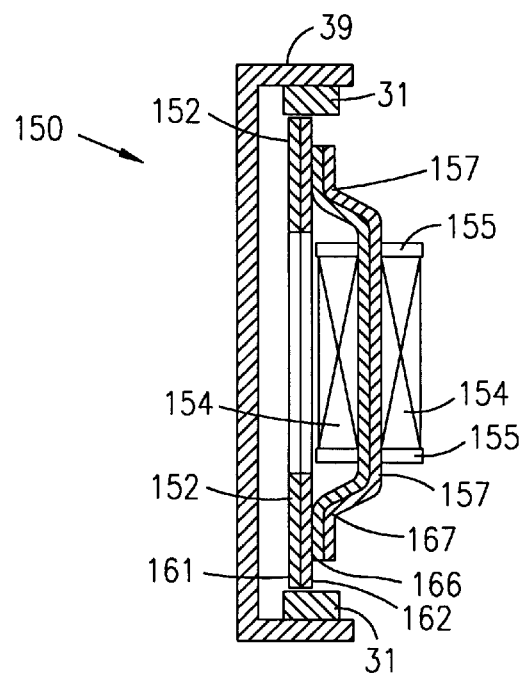

Now referring to FIG. 16 in conjunction with FIG. 17, there are shown cross-sectional views of motor 150. In FIG. 16 stator pole piece 152 is shown as being made up of two laminations 161, 162. Additionally, stator coil body 153 is shown as being made up of two laminations 163, 164. In FIG. 17, stator coil body 157 is shown having a curved profile made up of two laminations 166, 167. By curving stator coil body 157, coil 154 may be shifted further away from rotor 139 as compared with coil 154 wound on stator coil body 153 shown in FIG. 16.

Owing to flux variation, eddy current losses appear. To reduce eddy current losses, laminations may be added to form stator pole piece 152 (shown in FIG. 19). Additionally, radial slots 143 (shown in FIG. 19) may optionally be added to stator pole piece 152 (shown in FIG. 19) to further facilitate introduction of an offset angle as was described with respect to slots 43 of FIG. 4.

While a spindle motor having a rotating shaft, with an internal stator configuration has been described, other configurations of motors may be used when practicing the present invention. For example some other configurations include a stationary shaft motor, an in-hub motor, and the like.

External Stator Embodiments

Another motor in accordance with the present invention is of an external stator configuration for providing a large space for a rotor bearing and for a yoke (for mounting the stator winding). The external stator configuration also allows an external stator winding to be located on a PCB, where the PCB may include the circuitry for operating the motor. Optionally, an internal stator may be employed for additional flux shaping. Use of an internal stator allows flux shaping to be enhanced without exceeding allocated space for the motor.

Figure 10:
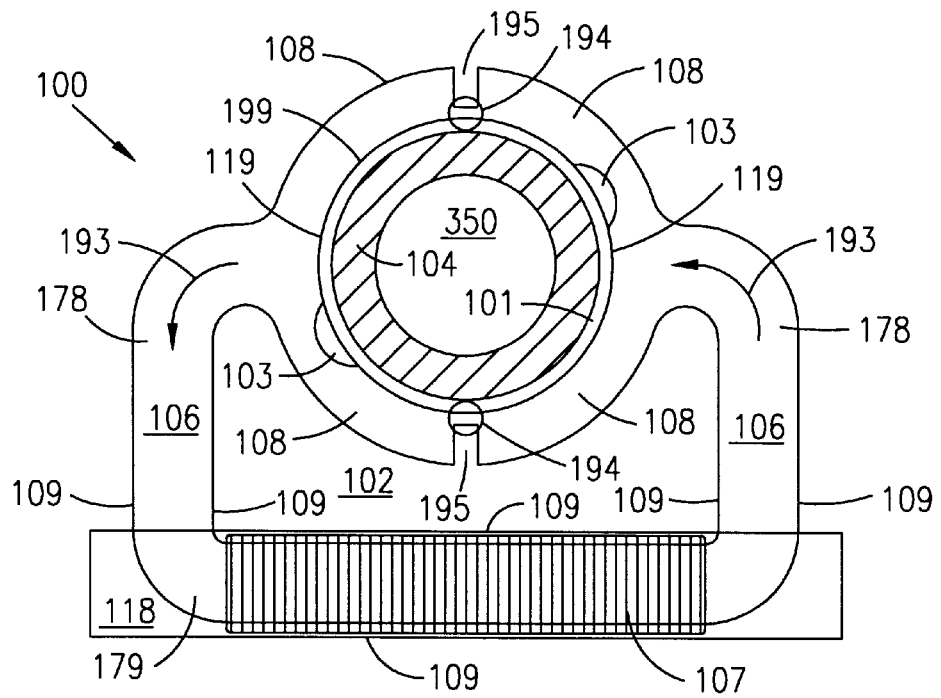
FIG. 10 is a top, partial cross-sectional view of an external stator alternate embodiment in accordance with the present invention.

Referring to FIG. 10, there is shown a top, partial cross-sectional view of a portion of an alternate embodiment of a motor 100 constructed in accordance with the principles of the present invention. A cross section of rotor backiron 104 is shown. Rotor backiron 104 is a portion of the hubshaft of the rotor. Optionally, rotor backiron 104 may define an opening 350 for receipt of an internal stator therein. Coil 107 is wrapped around stator 106. Stator 106 has four lobes 108, two notches 195 and a quasi-rectangular contour 109. Notches 195 create saturation regions 194 such that flux distributes through stator 106 as indicated by arrows 193.

Contour 109 in combination with two lobes 108 and a notch 195 define an air gap 102. Air gaps are also created between circular-like contour 199 of stator 106 and magnet 101 by the difference between an inner diameter of stator 106 and an outer diameter of magnet 101, namely, air gap 119. Air gap 119 is larger at pole notches 103 located along contour 199 of stator 106. Pole notches 103 are for shifting the detent torque from the mutual torque, as explained above. For further facilitating the shift between detent and mutual torque, magnet 101 may be directionally magnetized. Magnet 101 may be radially magnetized, diametrically magnetized, radially and diametrically magnetized, radially or diametrically magnetized with one or more anomalous magnetized regions, and the like.

Thus, it should be understood that above-described offset means with respect to internal stator motors may be employed with respect to external stator motors as well.

Lobes 108 shape flux for reducing detent torque. As this shaping reduces the detent torque, less current is needed to start motor 100. Lobes 108 also reduce magnetic flux leakage by increasing the amount of iron around magnet 101. Lobes also provide increased mutual torque for motor 100. Moreover, detent torque and mutual torque are substantially constant for motor 100 with lobes 108, zero crossing regions excepted.

The core of stator 106 is made as one piece. However, the core of stator 106 may be made of more than one piece. For example, stator 106 may be made in three pieces, e.g., two separate pole sections 178 and a third section 179 for the coil. All three pieces may be joined for good flux conduction.

Constructing stator 106 from three pieces, optionally allows winding the coil on the third section, and then attaching the wound coil and third section onto PCB 118. The pole sections may then be attached for forming stator 106.

Stator 106 may also be made as a solid or laminated structure. The structure may be made of any of a variety of known materials, including a steel alloy composition having silicon and the like.

Figure 11:
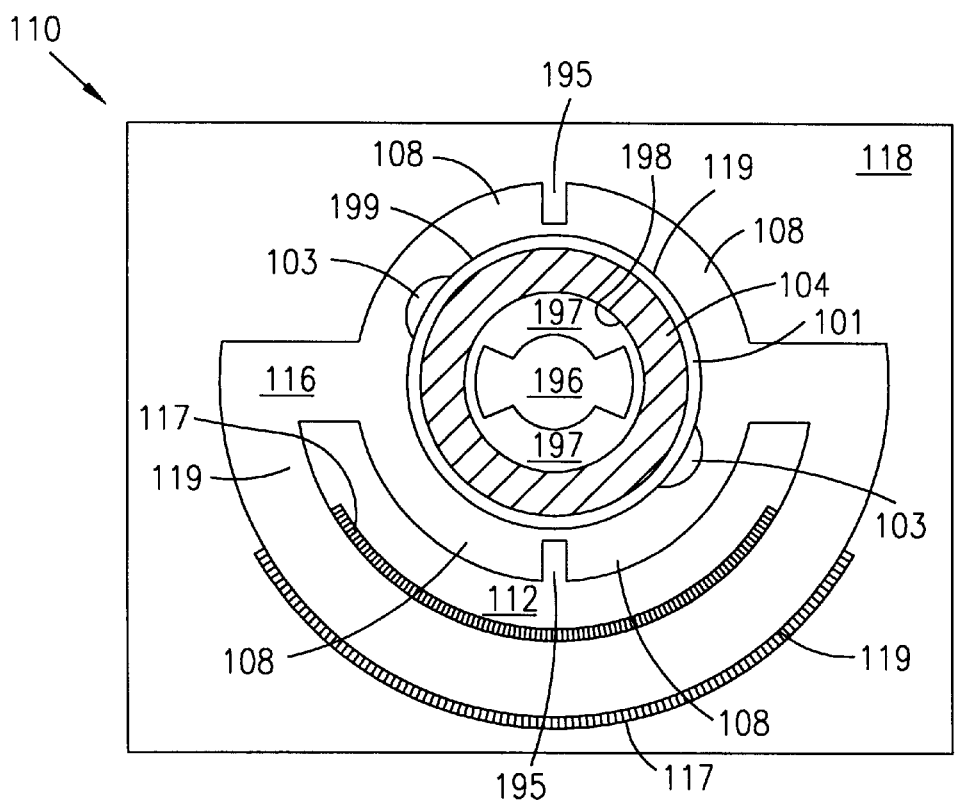
FIG. 11 is a top, partial cross-sectional view of another external stator alternate embodiment in accordance with the present invention.

Now referring to FIG. 11, there is shown a top, partial cross-sectional view of a portion of a motor 110 constructed in accordance with the principles of the present invention. While not illustrated, it should be understood that coil 117 is wrapped around stator 116. Stator 116 has four lobes 108, two notches 195, a circular-like contour 199 and a quasi-semicircular contour 119. Contour 119 in combination with a notch 195 and two lobes 108 define air gap 112. Quasi-semicircular contour 119 is formed to correspond with lobes 108 to minimize air gap 112 for improved power delivery to motor 110 from an excited coil 117 with fewer turns on coil 117 as compared with coil 107 of motor 100 shown in FIG. 10.

Stator 116 is made as one piece. However, stator 116 may be made of more than one piece. For example, stator 116 may be made in three pieces, e.g., two separate pole sections and a third section for the coil. All three pieces may be joined for good flux conduction.

Constructing stator 116 from three pieces, optionally allows winding of the coil on the third section, and then attaching the wound coil and third section onto PCB 118 (shown in FIG. 10). The pole sections may then be attached for forming stator 116. Stator 116 may also be made as a solid or laminated structure.

Optionally, a second internal stator 197 may be added to motor 110. Stator 197 may also be added to motor 100 (not shown with an internal stator). Stator 197 includes a slot 196 for forming an air gap therein. Outer diameter of stator 197 and inner diameter of backiron 104 define air gap 198. Stator 197 can be employed to further shape the detent torque of motor 110, especially in situations involving limited available space.

Figure 12:
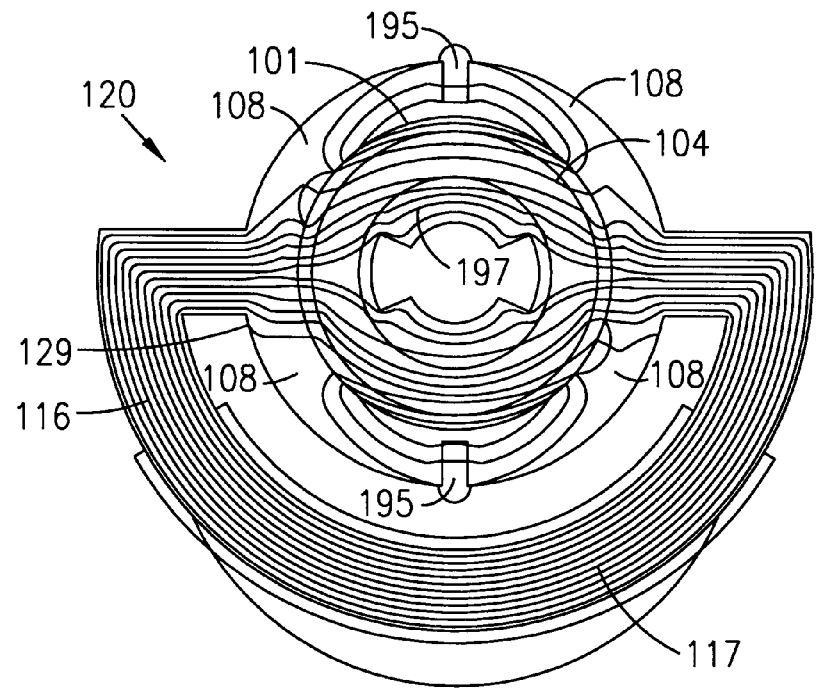
FIG. 12 shows magnetic flux lines based on a finite element analysis for a portion of the stator of FIG. 11 having an diametrically magnetized magnet.

Referring to FIG. 12, a diagram 120 of the results of a finite element analysis of motor 110 of FIG. 11 is shown indicating lines of magnetic flux. Flux lines 129 indicate that magnet 101 is diametrically magnetized, but the same principles would apply if magnet 101 had been radially magnetized. While this shaping of the lines of flux is shown for the top of stator 116, the same equally applies to the bottom of stator 116.

Figure 13:
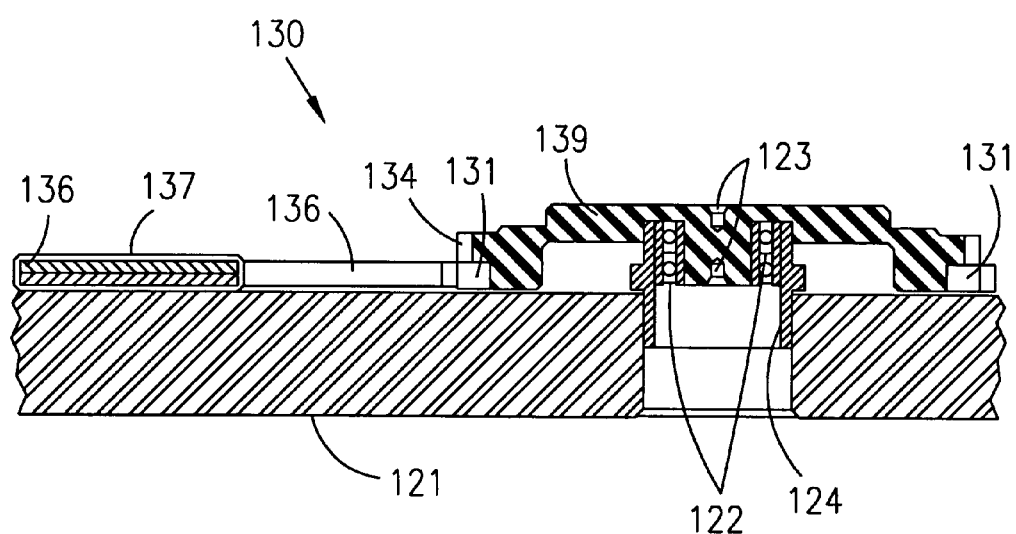
FIG. 13 is a cross-section of an external stator test motor in accordance with the present invention.

Referring to FIG. 13, there is shown a cross-section of an external stator configuration motor 130. Motor 130 is shown mounted to a test mounting plate 121; however, motor 130 may be mounted to a hard disc drive base casting, PCB, or like platform. Motor 130 is made up of stator 136, coil 137, rotor hubshaft 139, magnet 131, bearings 122, sleeve 124, and bearings 123.

Working Model

A working model of an interior stator, rotating shaft, brushless PMDC spindle motor 30 of FIG. 3B was built in accordance with the principles of the present invention. The parameters are given in Table A.

TABLE A

| Magnet outer diameter | 18.38 mm |
| --- | --- |
| Magnet inner diameter | 16.38 mm |
| Air gap | .125 mm |
| Stack height | 1.8 mm |
| Magnet height | 1.8 mm |
| Hub thickness | 1.2 mm |

Notably, these parameters are suitable for spindle motors.

The results from the working model are given in Table B.

TABLE B

| Magnetic detent torque | .74 mNm |
| --- | --- |
| Mutual torque at .390 A | 2.27 mNm |

The motor was operated by installing an optical detector aligned for detecting back emf crossings driving through a bi-polar H-bridge. The H-bridge was implemented with an L298 SGS integrated circuit. The sign of the motor current to produce starting torque in the appropriate direction was hard wired to avoid starting difficulties. Using this configuration, the detent torque and electromagnetic torque zeros differed by approximately 10 degrees, and the motor started at approximately 0.24 amps.

Figure 24:
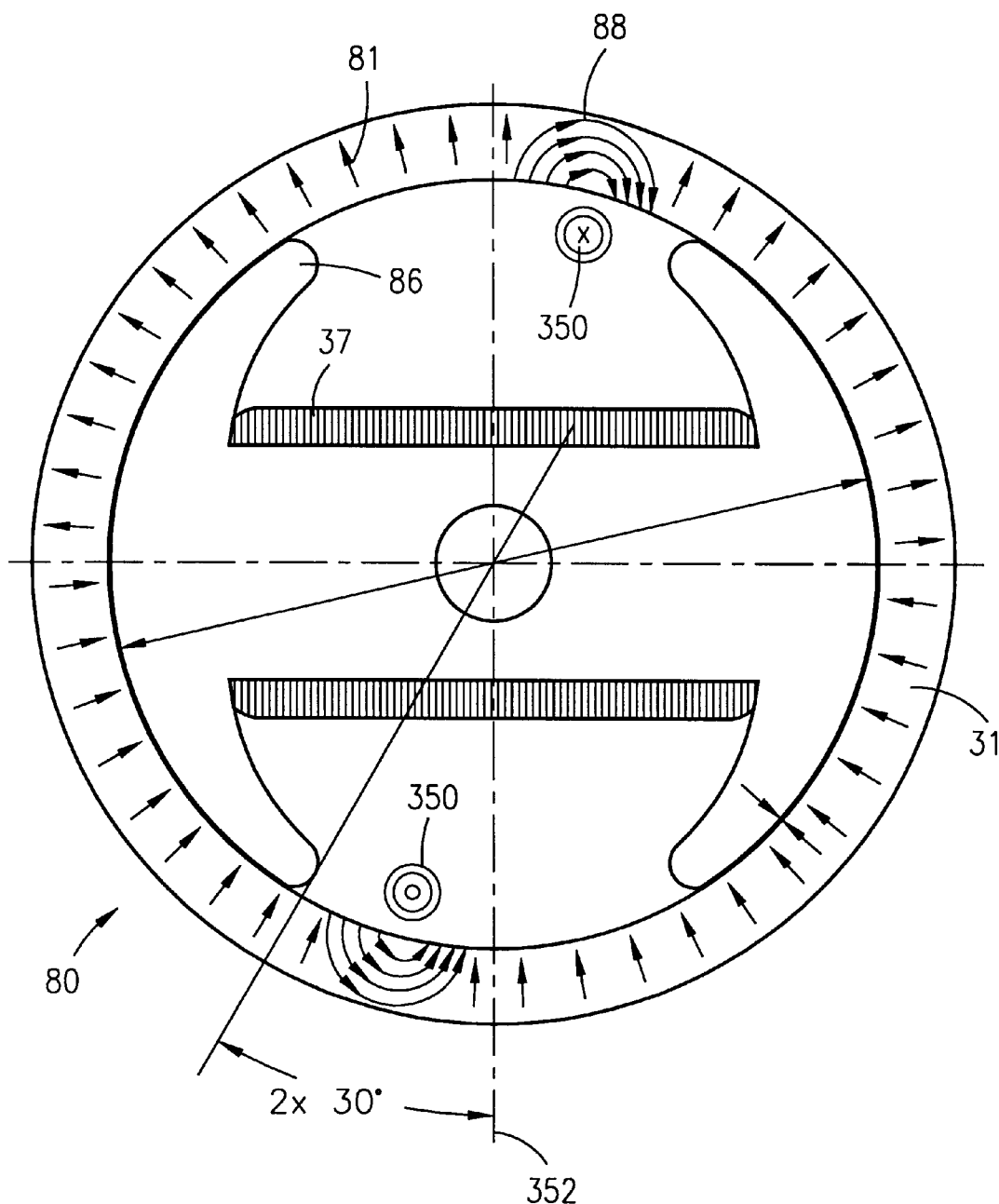
FIG. 24 is an enlargement of FIG. 8 showing the positioning of a magnetization coil for creating the magnetic anomalies.

FIG. 24 is an enlarged view of the magnetic anomaly embodiment of the invention illustrated in FIG. 8. Accordingly, the earlier description of the FIG. 8 embodiment also applies to FIG. 24, and thus the entire earlier description will not be repeated here, for purposes of conciseness.

FIG. 24 illustrates a top exposed and partial cross-sectional view of a portion of the motor 80. The illustrated portion of the motor 80 comprises a magnet 31, a coil 37, and a stator 86. The rotor 39 has been omitted from FIG. 24. As before, the magnet 31 has a global radial magnetization, as indicated by arrows 81, but it may alternatively be diametrically magnetized. The magnet 31 also includes magnetic anomalies, or disruptions in the global magnetization, as indicated by curved flux lines 88. These disruptions in the global magnetization cause an offset angle to be introduced between the mutual and detent torques of the motor 80 such that torque nulls do not coincide.

Also shown in FIG. 24 is a single wire magnetization coil 350, which is used to generate the magnetic anomaly flux lines 88. The wires of the single wire magnetization coil 350 are substantially straight as they pass by the magnet 31. Accordingly, the magnetic field imposed on the magnet 31 when the magnetization coil 350 is energized is substantially the magnetic field generated when current flows through a single straight conductor, i.e. the flux lines are a series of concentric circles centered about the conductor. This can be seen from the shape of the flux lines 88 illustrated in FIGS. 8 and 24.

The field generated by the single wire magnetization coil 350 is approximately one tenth of the magnetic field imposed on the magnet 31 in the course of its overall global magnetization, as will be discussed in more detail below. Accordingly, the magnetizing effect of the single wire magnetization coil only has a local effect on the magnet 31, which serves to disrupt the otherwise generally uniform global magnetization. In this regard, it should be noted that the disruption or anomaly is created deliberately in the global magnetization, and the disruptions are thus different from transitions between areas of radial and diametral magnetization, or transitions between the direction of magnetization. Also, it will be appreciated the term "generally uniform magnetization" includes the transition areas between areas of radial and diametral magnetization, or transitions between the direction of magnetization, which arise inherently in a permanent magnet having areas of differing magnetization or magnetization directional changes.

In the illustrated embodiment, each magnetic anomaly or disruption occupies an arc of less than 30°, extending from the axis of symmetry or North/South axis 352 of the overall magnetization. The single wire magnetization coils are therefor offset by approximately 15° from the axis 352 during application of the local magnetization.

It will of course be appreciated that the single wire magnetization coils 350 are not actually present in the motor 80 as shown, but are rather present in a magnetizing device as described below with reference to FIG. 25.

Figure 25:
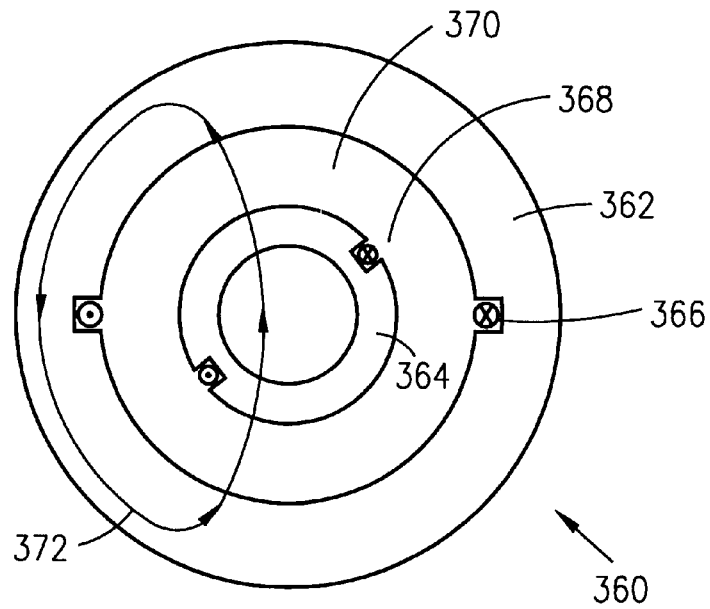
FIG. 25 is a plan view of a magnetizer for creating the magnetic anomalies in the permanent magnet illustrated in FIGS. 8 and 24.

A magnetizing device, generally indicated by the numeral 360, for magnetizing the magnet 31 with a radial magnetization and two disruptions or magnetic anomalies is illustrated in FIG. 25. The magnetizing device comprises a first ring 362 made of a steel with a high magnetic saturation value, a second smaller ring 364 made of the same material, and first and second single wire magnetization coils 366, 368. The first and second magnetization coils 366, 368 are located in notches defined in the first and second rings 362, 364 respectively as shown.

The magnetizing device 360 is constructed in accordance with the general principles of magnetizer design, which are well known in the magnetizer art and will thus not be discussed further here. These general principles will determine, for example, the selection of the magnetizer backiron, and the shaping of the steel components.

A gap 370 is defined between the first and second rings 362, 366 for receiving a ring of hard magnetic material to be magnetized to form the magnet 31.

The first magnetizing coil 366 is used to generate the radial global magnetization indicated by the arrows 81 in FIG. 24, and the magnetizing field is generated by a 100 μs or less pulse of current of 20 kA through the first magnetizing coil 366. The clearance between the edge of the first magnetizing coil 366 and the edge of a magnet 31 placed between the first and second rings 362, 364 is approximately 10 mil (0.254 mm). The first magnetizing coil is made of #12 wire. Upon excitation, the first magnetizing coil generates a magnetic field across the gap 370 which is approximately radial. For purposes of illustration only, a single magnetic flux line 372 generated by the first magnetizing coil 366 is shown. It will of course be appreciated that the magnetizing device 360 could be configured to provide a different global magnetization, such as a diametral global magnetization, or a combination of diametral and radial magnetizations.

The second magnetizing coil 368 is used to disrupt the global magnetization and thus to generate the two disruptions or magnetic anomalies indicated by the magnetic flux lines 88 in FIG. 24. The local magnetizing field is generated by a 100 μs or less pulse of current of 2 kA through the second magnetizing coil 368. The clearance between the edge of the second magnetizing coil 368 and the edge of a magnet 31 placed between the first and second rings 362, 364 is approximately 1 mil (0.0254 mm). The second magnetizing coil is made of #22 wire.

Thus it will be appreciated that the second magnetizing coil 368 is positioned approximately ten times closer to the magnet 31 than the first magnetizing coil 366, and that the current passing through the second magnetizing coil 368 is approximately one tenth of the current passing through the first magnetizing coil 366. These relationships may be adjusted within limits to provide a satisfactory disruption of the global magnetic field. In particular, the current through the second magnetizing coil 368 is preferably between about 5% and about 20% of the current through the first magnetizer coil 366, and the second magnetizer coil is preferably between 0 and 5 mils (0 to 0.127 mm) from the edge of the magnet 31 in use. Also, the number of turns of the coils 366, 368 may be varied to provide the desired magnetic field strengths. In general however, the magnetic field generated by the second magnetizing coil 368 is between 5 and 20% of the magnetic field generated by the first magnetic coil 366.

Figure 26:
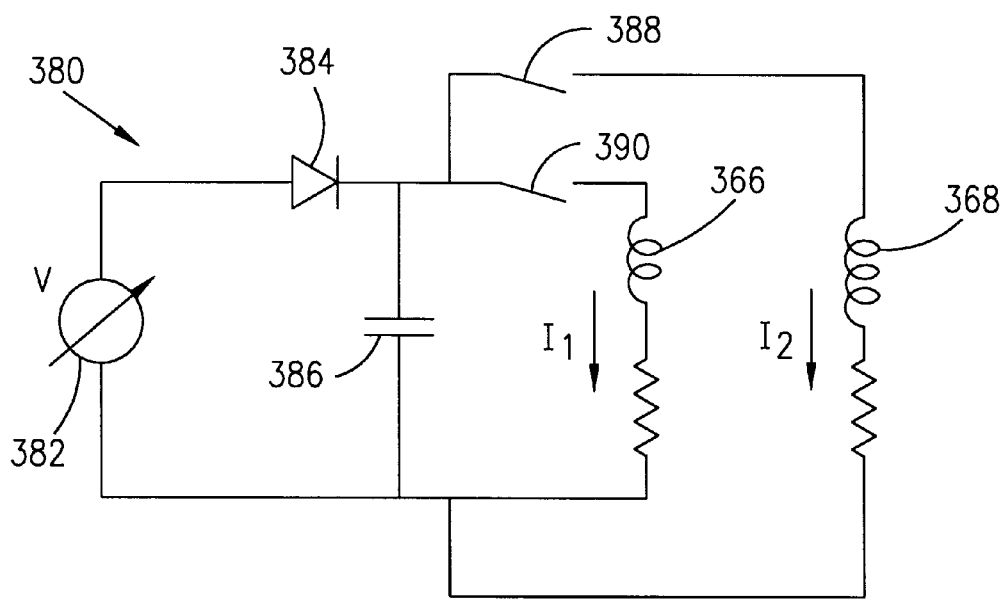
FIG. 26 is a schematic representation of an electrical circuit for the magnetizer illustrated in FIG. 25.

A circuit 380 for energizing the first and second magnetizing coils 366, 368 is shown in FIG. 26. The circuit comprises an electrical power source 382, a diode 384, a capacitor 386 and two switches 388, 390. The switches 388 and 390 are operated sequentially to energize the first and second magnetizing coils 36 and 368. The diode 384 and the capacitor 386 are to protect the power source 382 from back emf generated when either one of the switches 388 or 390 are opened.

In use of the magnetizing device 360, the magnet 31 is inserted into the gap 370. (It will be appreciated here that the "magnet" 31 is not magnetized yet, and the term "magnet" is used here to include a ring of the appropriate size and hard magnetic material, which is about to become a magnet). The first magnetizing coil 366 is energized with a current of magnitude 20 kA. This applies a global magnetization to the magnet 31, in this case a radial global magnetization. The first magnetic coil 366 is then de-energized.

After the magnetic field generated by the first magnetizing coil has subsided, the second magnetizing coil 368 is energized with a current of 2 kA. This generates a local magnetizing field of approximately one tenth of the energy of the global magnetizing field. The local magnetizing field as it passes through the magnet 31 is substantially a segment of the magnetic field generated when current flows through a single straight conductor, i.e. the flux lines, as they pass through the magnet 31, are a series of concentric circular arcs centered about the conductor. This can be seen from the shape of the flux lines 88 illustrated in FIGS. 8 and 24.

The resulting disruptions of the global magnetization of the magnet 31 each occupy an arc of less than 30° extending from the axis of symmetry or North/South axis of the overall magnetization. These disruptions or magnetic anomalies shift both the detent and the mutual torques of the motor 80.

It will be appreciated that the disruption of the global magnetic field may be accomplished in other ways without departing from the spirit and the scope of teh invention. For example, the above two magnetization steps could be accomplished in two separate magnetizers.

Other mechanisms for causing a shift between detent and mutual torque may be employed with variations in geometries in construction of the stator and/or various other manners of orienting magnetic direction to provide directionally magnetized magnets. The number of alternate geometries and magnetization are too numerous to detail within this specification, yet such alternate approaches are considered within the scope of the present invention.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

What is claimed is:

1. A method of magnetizing a ring shaped magnet to provide an offset angle between detent and mutual torques of a single-phase, brushless, direct current spindle motor for a hard disc drive, the method comprising the steps of:

applying a global magnetic field to the magnet thereby to apply a generally uniform global magnetization to the magnet;

applying a local magnetic field to a segment of the magnet to disrupt the global magnetization of the magnet in that segment of the magnet, wherein resulting magnetic disruptions introduce detent and mutual torque phase shifts that provide a net phase shift, thereby providing the offset angle between detent and mutual torques.

2. A method according to claim 1 wherein the strength of the local magnetic field is between 5% and 20% of the strength of the global magnetic field.

3. A method according to claim 2 wherein the global magnetization of the magnet is disrupted by the application of the local magnetization over less than 30° of the magnet at each location where the local magnetization is applied.

4. A method according to claim 1 wherein the steps of applying the global and local magnetic fields comprises the steps of:

locating the magnet proximate to a first magnetizing coil;

energizing the first magnetic coil to create a global magnetic field through the magnet which is sufficient to create a generally uniform global magnetization of the magnet;

locating the magnet proximate to a second magnetizing coil;

energizing the second coil to create a local magnetic field in a segment of the magnet, thereby to disrupt the global magnetization of the magnet in the segment of the magnet.

5. A method according to claim 4 wherein the locating steps take place simultaneously by means of the positioning of the magnet between the first and second coils.

6. A method according to claim 4 wherein the strength of the local magnetic field is between 5 and 20% of the strength of the global magnetic field.

7. A method according to claim 4 wherein the magnet is located between 1 and 5 mils from the second magnetizing coil.

8. A method according to claim 4 wherein the global magnetization of the magnet is disrupted by the application of the local magnetization over less than 30° of the magnet at each location where the local magnetization is applied.

9. A method according to claim 8 wherein the local magnetic field is applied to the magnet at two diametrically opposed locations on the magnet.

10. A method according to claim 9 wherein the two diametrically opposed locations at which the local magnetic field is applied are offset from an axis of symmetry of the global magnetization by approximately 15°.

* * * * *